(12) United States Patent
Alsup

(10) Patent No.: US 9,471,305 B2
(45) Date of Patent: Oct. 18, 2016

(54) MICRO-CODED TRANSCENDENTAL INSTRUCTION EXECUTION

(71) Applicant: Samsung Electronics Co., Ltd., Suwon-si, Gyeonggi-do (KR)

(72) Inventor: Mitchell Alsup, Austin, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 14/458,145

(22) Filed: Aug. 12, 2014

(65) Prior Publication Data

US 2015/0324949 A1 Nov. 12, 2015

Related U.S. Application Data

(60) Provisional application No. 61/991,344, filed on May 9, 2014.

(51) Int. Cl.
| | | |
|---|---|---|
| G06F 7/57 | (2006.01) | |
| G06F 1/03 | (2006.01) | |
| G06T 15/00 | (2011.01) | |
| G06F 9/30 | (2006.01) | |
| G06T 1/20 | (2006.01) | |
| G06T 3/40 | (2006.01) | |

(52) U.S. Cl.
CPC . *G06F 9/30* (2013.01); *G06F 1/03* (2013.01); *G06F 7/57* (2013.01); *G06F 9/30145* (2013.01); *G06T 1/20* (2013.01); *G06T 3/4007* (2013.01); *G06T 15/005* (2013.01); *G06T 2200/28* (2013.01)

(58) Field of Classification Search
None
See application file for complete search history.

(56) References Cited

U.S. PATENT DOCUMENTS

| | | | | |
|---|---|---|---|---|
| 5,463,574 A | * | 10/1995 | Desrosiers | G06F 7/556 708/495 |
| 6,181,355 B1 | * | 1/2001 | Brethour | G06F 1/0356 345/522 |
| 7,178,005 B1 | * | 2/2007 | Jordan | G06F 9/3851 711/217 |
| 7,640,285 B1 | * | 12/2009 | Oberman | G06F 7/57 708/272 |
| 8,633,936 B2 | * | 1/2014 | Du | G06T 15/005 345/501 |
| 2009/0027396 A1 | * | 1/2009 | Frisken | G06T 11/203 345/442 |
| 2012/0321219 A1 | * | 12/2012 | Keithley | G06T 3/4007 382/300 |
| 2014/0244968 A1 | * | 8/2014 | Greyzck | G06F 15/76 712/3 |

OTHER PUBLICATIONS

Bendersky, Eli; "Horner's rule: efficient evaluation of polynomials"; Mar. 30, 2010; p. 1-4; http://eli.thegreenplace.net/2010/03/30/horners-rule-efficient-evaluation-of-polynomials.*

"Using Horner's Method"; Jul. 2, 2011; Mathematics Stack Exchange; p. 1-3; http://math.stackexchange.com/questions/49051/using-horners-method.*

* cited by examiner

*Primary Examiner* — Joni Richer
(74) *Attorney, Agent, or Firm* — Sherman IP LLP; Kenneth L. Sherman; Steven Laut

(57) ABSTRACT

A method for graphics processing includes generating one or more transcendental instructions in a graphics processing unit (GPU). Micro-code is formed for processing the one or more transcendental instructions in the GPU. The microcode is processed using an iterative process including cubic interpolation and an evaluation of a cubic polynomial.

29 Claims, 20 Drawing Sheets

| Instruction | Major OpCode | Major Opcode | Minor OpCode |
|---|---|---|---|
| FCMP | 00111 | | 000111 |
| SCMP | 11010 | | 011010 |
| UCMP | 11011 | | 011011 |
| FCLASS | | | 001011 |
| SCLASS | | 01010 | 111010 |
| UCLASS | | | 111011 |
| AND | 11101 | | 101101 |
| OR | 11110 | | 101110 |
| XOR | 11111 | | 101111 |
| placeholder | | | |

Transcendental Cubic Interpolation Tables

| instruction | Per Lane | µLoop Buffer |
|---|---|---|
| 1/x | 24 entries | |
| 1/√x | 32 entries | |
| √x | 32 entries | |
| sin(x) | 16 entries | 2/π |
| cos(x) | 0 entries | 2/π |
| ln2(x) | 21 entries | |
| ln(x) | 0 entries | 1/ln2(e) |
| 2**x | 16 entries | |
| e**x | 0 entries | ln2(e) |
| 10**x | 0 entries | ln2(10) |
| | 109 entries of 65-70 bits | |

FIG. 17

MICRO-CODED TRANSCENDENTAL INSTRUCTION EXECUTION

CROSS-REFERENCE TO RELATED APPLICATION

This application claims the priority benefit of U.S. Provisional Patent Application Ser. No. 61/991,344, filed May 9, 2014, which is incorporated herein by reference in its entirety.

TECHNICAL FIELD

One or more embodiments generally relate to a single-instruction multiple-thread (SIMT) processing environments and, in particular, processing transcendental instructions using interpolation for resource reduction.

BACKGROUND

SIMT processors choose which instruction to execute almost every SIMT cycle. Each instruction identifies the resources that it requires, and when those resources are available the instruction becomes a candidate for execution. At each SIMT cycle a potentially different group of threads are selected to execute.

The SIMT execution engine is augmented with micro-coded instruction execution. Most instructions are processed without the use of micro-code in a normal SIMT mode. When a micro-coded instruction is detected, micro-code can take over the execution pipeline and perform a series of micro-code instructions, and then return the execution pipeline back to normal instruction processing.

SUMMARY

One or more embodiments generally relate to processing transcendental instructions using interpolation for resource reduction. In one embodiment, a method provides for graphics processing includes generating one or more transcendental instructions in a graphics processing unit (GPU). Micro-code is formed for processing the one or more transcendental instructions in the GPU. The micro-code is processed using an iterative process including cubic interpolation and an evaluation of a cubic polynomial.

In one embodiment a non-transitory computer-readable medium having instructions which when executed on a computer perform a method comprising: generating one or more transcendental instructions in a graphics processing unit (GPU). In one embodiment, micro-code for processing the one or more transcendental instructions is formed in the GPU. In one embodiment, the micro-code is processed using an iterative process including cubic interpolation and an evaluation of a cubic polynomial.

In one embodiment, a GPU for an electronic device comprises one or more processing elements coupled to a memory device. In one embodiment, the one or more processing elements: generate one or more transcendental instructions in the GPU, form micro-code for processing the one or more transcendental instructions in the GPU, and process the micro-code using an iterative process including cubic interpolation and an evaluation of a cubic polynomial.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 13 shows example operation code (OpCode) table entries, according to an embodiment.

FIG. 17 shows an example transcendental cubic interpolation table, according to an embodiment.

DETAILED DESCRIPTION

Figure 1:
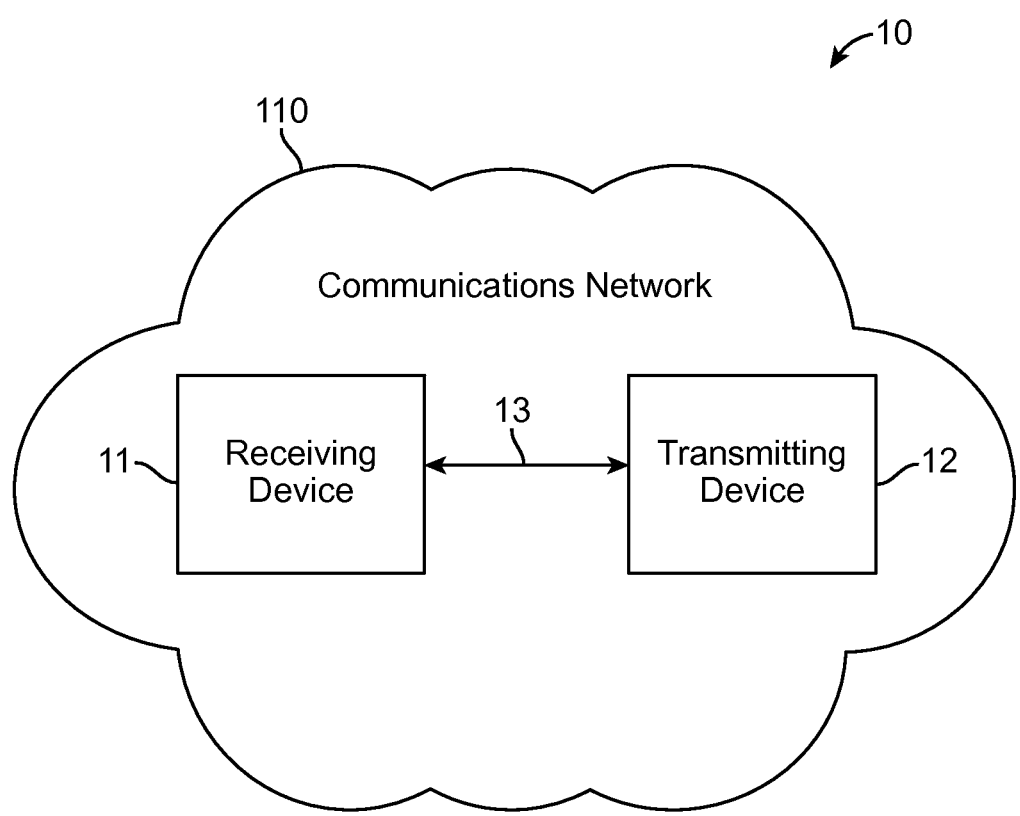
FIG. 1 shows a schematic view of a communications system, according to an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments provide organizing multiple instructions into schedulable structure referred to as a trace. In one embodiment, a trace is a region of code that contains a number of instructions and the following properties: a trace will not begin execution until specified events have occurred; a trace will not begin execution until all required resources are available; and a trace once entered into execution, executes to completion. In one or more embodiments, the trace bundles a plurality of instructions into a single schedulable unit. The trace contains a header (e.g., a trace header). In one embodiment, the trace header includes a list of resources that the multiple instructions in the trace need or require. In one embodiment, when all needed/required resources are available, the trace may be scheduled, and a large plurality of instructions may execute such that no stalls will occur.

In one embodiment, in addition the trace header is organized to simplify matching of resource requests to available resources, and the SIMT scheduling process. In one embodiment, because the trace runs to completion, the data-path may be augmented with a small low overhead tunnel register file. In one or more embodiments, the tunnel file reduces the power of accessing the register file of a GPU pipeline. In one embodiment, results and operands may be stored in the tunnel register file for subsequent use within a trace, reducing the number of register file accesses. In one embodiment, the tunnel register file does not persist across trace boundaries and thus may be considered inexpensive with respect to context switching and SIMT scheduling. In one embodiment, the shader compiler may use the tunnel register file as a small repository and avoid many read and many write accesses to the register file, which reduces power consumption.

One or more embodiments provide for micro-code exercising control over the shader data path in a GPU. In one embodiment, the SIMT execution engine is augmented with micro-coded instruction execution. Most instructions are processed without the use of micro-code in a normal SIMT mode. In one embodiment, when a micro-coded instruction is detected, micro-code may take over the execution pipeline, perform a series of micro-code instructions, and then return the execution pipeline back to normal instruction processing.

In one or more embodiment, transcendental instructions are processed by micro-code. In one embodiment, by utilizing cubic interpolation and Horner evaluation of the cubic polynomial, comparable performance is achieved as compared to conventional approaches, but at a lower physical area (e.g., less hardware is required, such as memory, processing elements, etc.) and at comparable power requirements using reduced physical structures. In one example embodiments, the processing steps of eight transcendental instructions are described below, including the coefficient tables, indexing schemes, and which micro-code instructions are processed on which cycles.

In one embodiment, as opposed to Quadratic Interpolation, a cubic interpolation scheme is employed and does not require a squaring circuit, or multiplier trees with odd shapes, and the computation is iterative rather than a singular pass. In one embodiment, micro-coded operation of the shader data path in a GPU is provided where transcendental instructions are executed using cubic interpolation. In one example, smaller table size is required as compared to techniques using quadratic interpolation.

In one embodiment, a method provides for graphics processing includes generating one or more transcendental instructions in a GPU. Micro-code is formed for processing the one or more transcendental instructions in the GPU. The micro-code is processed using an iterative process including cubic interpolation and an evaluation of a cubic polynomial.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a Blackberry®). Such protocols may include, for example, GSM, GSM plus EDGE, CDMA, quadband, and other cellular protocols. In another example, a long range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include a mobile telephone devices, television systems, cameras, camcorders, a device with audio video capabilities, tablets, wearable devices, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, or combinations of these (e.g., video conferences).

Figure 2:
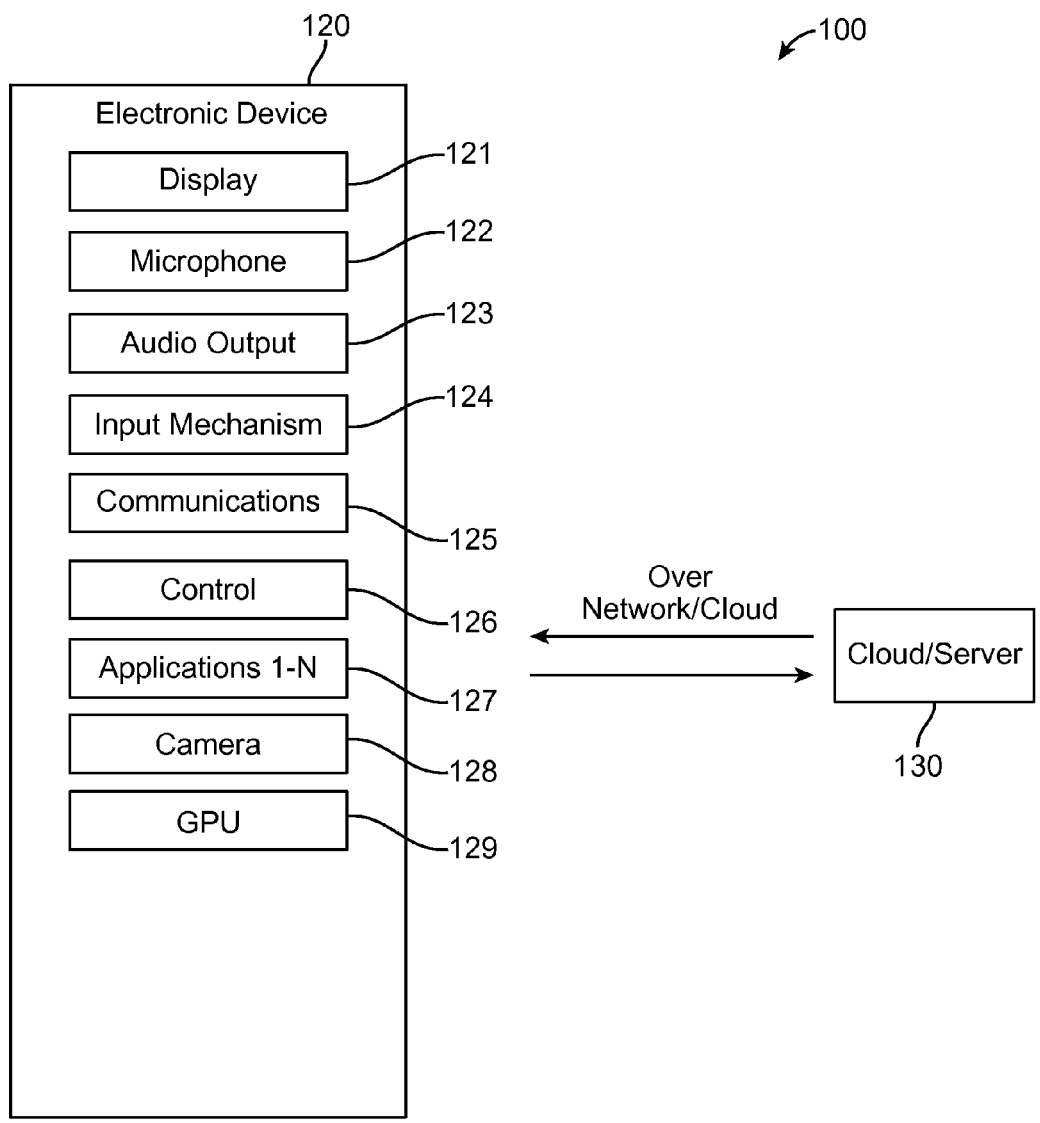
FIG. 2 shows a block diagram of architecture for a system including a mobile device including a graphical processing unit (GPU) module, according to an embodiment.

FIG. 2 shows a functional block diagram of an architecture system 100 that may be used for graphics processing in an electronic device 120. Both the transmitting device 12 and receiving device 11 may include some or all of the features of the electronics device 120. In one embodiment, the electronic device 120 may comprise a display 121, a microphone 122, an audio output 123, an input mechanism 124, communications circuitry 125, control circuitry 126, a camera module 128, a GPU module 129, and any other suitable components. In one embodiment, applications 1-N 127 are provided and may be obtained from a cloud or server 130, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., Bluetooth® headphones or a Bluetooth® headset).

In one embodiment, the display 121 may include any suitable screen or projection system for providing a display visible to the user. For example, display 121 may include a screen (e.g., an LCD screen) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a Bluetooth® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a map application, a media application (e.g., QuickTime, MobileMusic.app, or MobileVideo.app), social networking applications (e.g., Facebook®, Twitter®, etc.), an Internet browsing application, etc. In some embodiments, the electronics device 120 may include one or multiple applications operative to perform communications operations. For example, the electronics device 120 may include a messaging application, a mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera module 128 comprises one or more camera devices that include functionality for capturing still and video images, editing functionality, communication interoperability for sending, sharing, etc. photos/videos, etc.

In one embodiment, the GPU module 129 comprises processes and/or programs for processing images and portions of images for rendering on the display 121 (e.g., 2D or 3D images). In one or more embodiments, the GPU module may comprise GPU hardware and memory (e.g., the processing element 400 architecture (FIG. 4), processing structure 600 (FIG. 6), pipeline 1400 (FIG. 14), static random access memory (SRAM), dynamic RAM (DRAM), processing elements, cache, etc.).

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
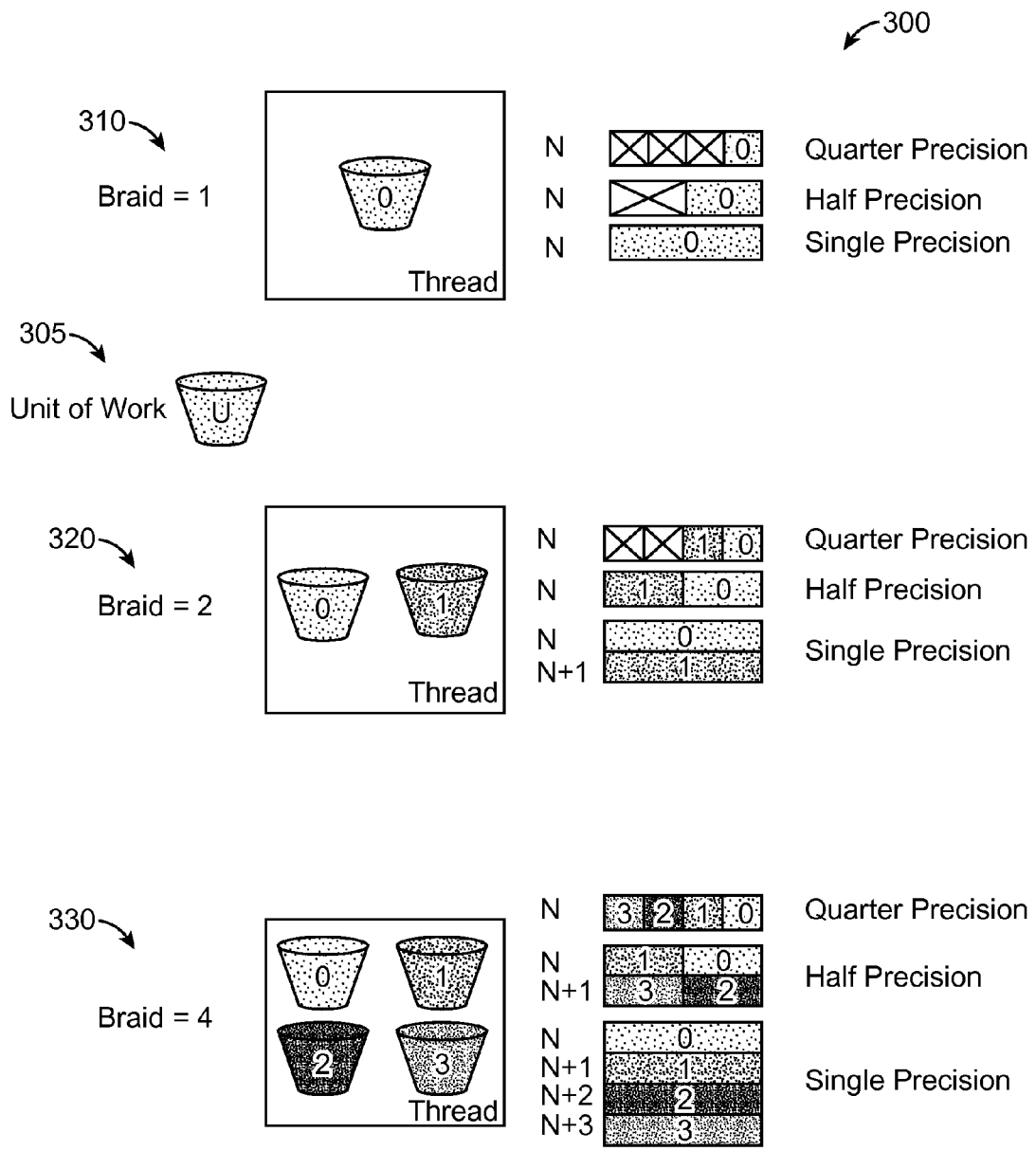
FIG. 3 illustrates packing including one or more units of work.

FIG. 3 shows a diagram 300 of example WARP structures including one or more units of work. In one example, a unit of work is a set of input data that will pass through a shader <program> to produce an output data set. In one embodiment, the compiler bundles 1, 2, or 4 units of work into a single thread in order to efficiently process data of different sizes. This bundle is known as a pack. The number of elements in a pack determines how less than full width computations are performed, as shown in the diagram 300. In one example, braid −1 310 shows a thread with a unit of work 305 0, braid −2 320 shows a thread with units of work 305 0 and 1, and braid −4 330 shows a thread with units of work 305 0, 1, 2 and 3.

In one example, a number of work units 305 are bound into a thread and then a number of threads are bound together to execute a shader <program> into a structure referred to as a WARP. A WARP binds a multiplicity of work units 305 into a single point of control. In one example embodiment, the WARP may contain up to 32 threads, and a compiler of a GPU (e.g., part of the GPU module 129, FIG. 2) may pack up to 4 units of work 305 (e.g., braid −4 330) into a single thread. In one example embodiment, the braiding factor determines the placement of input data into the threads of a WARP. In one embodiment, a processing element 400 (FIG. 4) may process up to 8 WARPs. In one example embodiment, each WARP is associated with 64-registers in the scalar register file. In one example embodiment, each scalar register is 32-bits in size. In one example embodiment, a 3-bit WARP Identifier is concatenated with the scalar register specifier in an instruction in order to fully address a scalar register file. In one example embodiment, all threads in the WARP share the same scalar register file.

In one example embodiment, a thread is a point of control within a WARP. Each thread is associated with a <thread> Register File. In one example embodiment, a thread may be allocated as few as 8 and as many as 256 registers with 8 register granularity. In one example embodiment, the WARP carries a register base address which relocates instruction register specifiers into Register File addresses. In one example embodiment, the Register File 420 (FIG. 4) contains 32 KBytes of storage, which may be allocated to various WARPs. In one example embodiment, when the shader program uses 32 or fewer registers per thread, all 8 WARPs may be active simultaneously. In one embodiment, WARPs from different shaders may have different sized Register Files. In one example embodiment, the size of a given Register File 420 is found in a shader header.

In one example embodiment, a 2-bit WARP braiding field identifies the mode of operation of the threads within the WARP. In one embodiment, the braiding enables the compiler of the GPU to produce optimal codes when shader programs utilize half precision and quarter precision instructions. In one example embodiment, the instructions compute 2 or 4 units of work 305 in a single instruction per thread when braided. In one example embodiment, the units of work 305 are governed by an execution mask, one bit of each mask governs a unique unit of work over the WARP. In one example embodiment, each instruction in a shader <program> identifies the associated unit of work 305 so that it may be properly governed. In one embodiment, the execution mask is manipulated to effect predication and control transfer. In one example embodiment, a simple code sequence performs most of the manipulation with compares instructions with label instructions.

In one embodiment, a WARP executes instructions on behalf of all bound threads in such a way that each instruction sees the results of the previous instruction and may use such as operands immediately via forwarding or with some delay by utilizing a tunnel file. In one example embodiment, a trace is a shader program fragment and consists of a trace header and a number of instructions. In one example embodiment, the trace header contains a set of resources that must be available prior to running the instructions with the trace and a set of bit vectors of outstanding <previous> request that must have been performed prior to scheduling this WARP back into execution. The WARP scheduler uses this information in deciding which WARP to schedule <next>.

In one example embodiment, a trace has a limited maximum size (in the range of 64 to 128 instructions), and the compiler of the GPU will break a trace when the instruction sequence is too long, or when an instruction needs an outstanding request as an operand (such as a Load result or a texture result.). In one embodiment, a WARP is in one of 4 states, Idle, Initializing, Executing, or Waiting. Once configured and initialized, the WARP may be scheduled into operation when the resources required are available. In one example embodiment, once scheduled the WARP will execute all of the instructions in a trace. This gives the WARP scheduler time to find a subsequent WARP that may enter execution (again).

Figure 4:
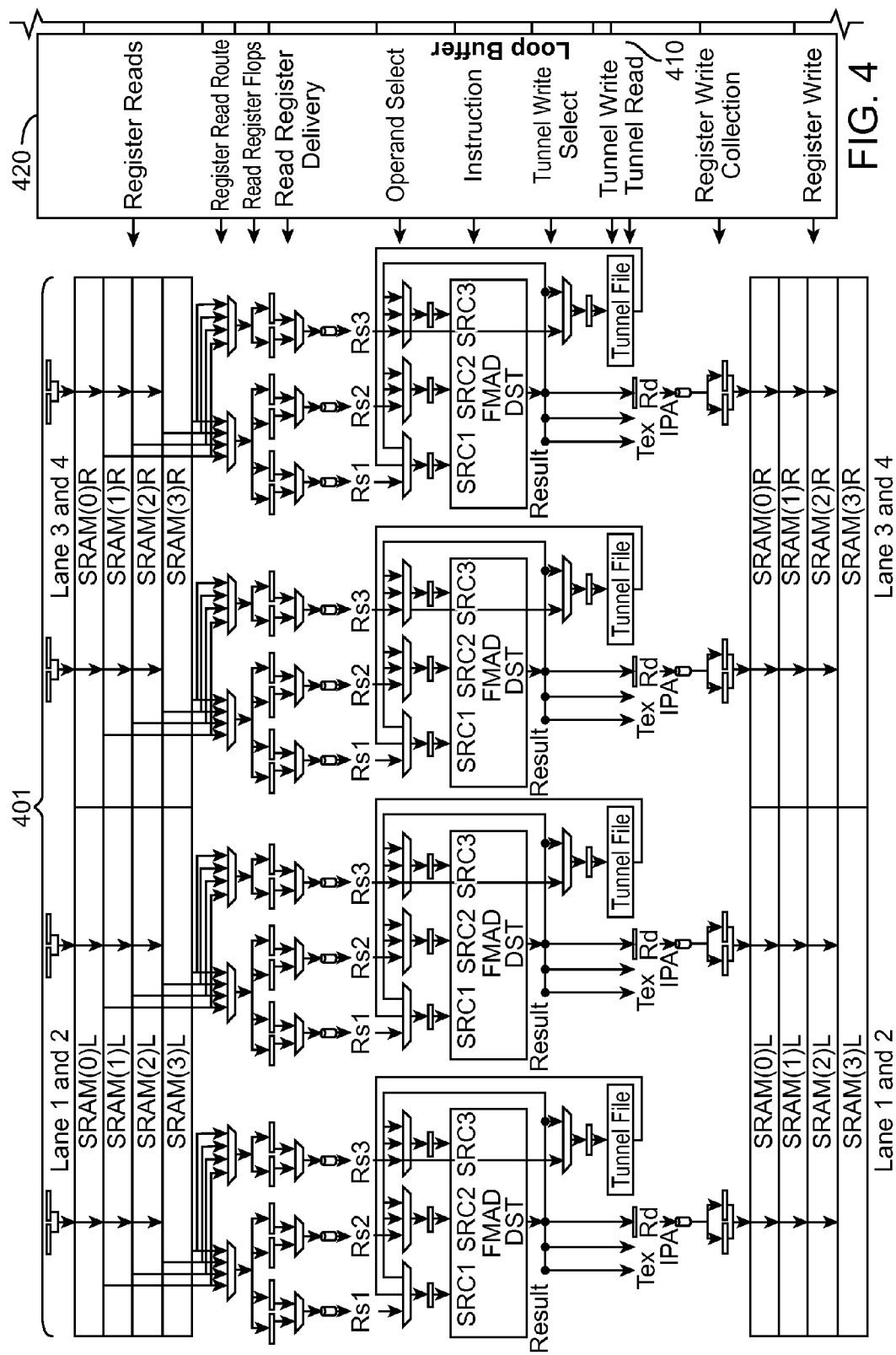
FIG. 4 shows an example processing element architecture, according to an embodiment.
Figure 4:
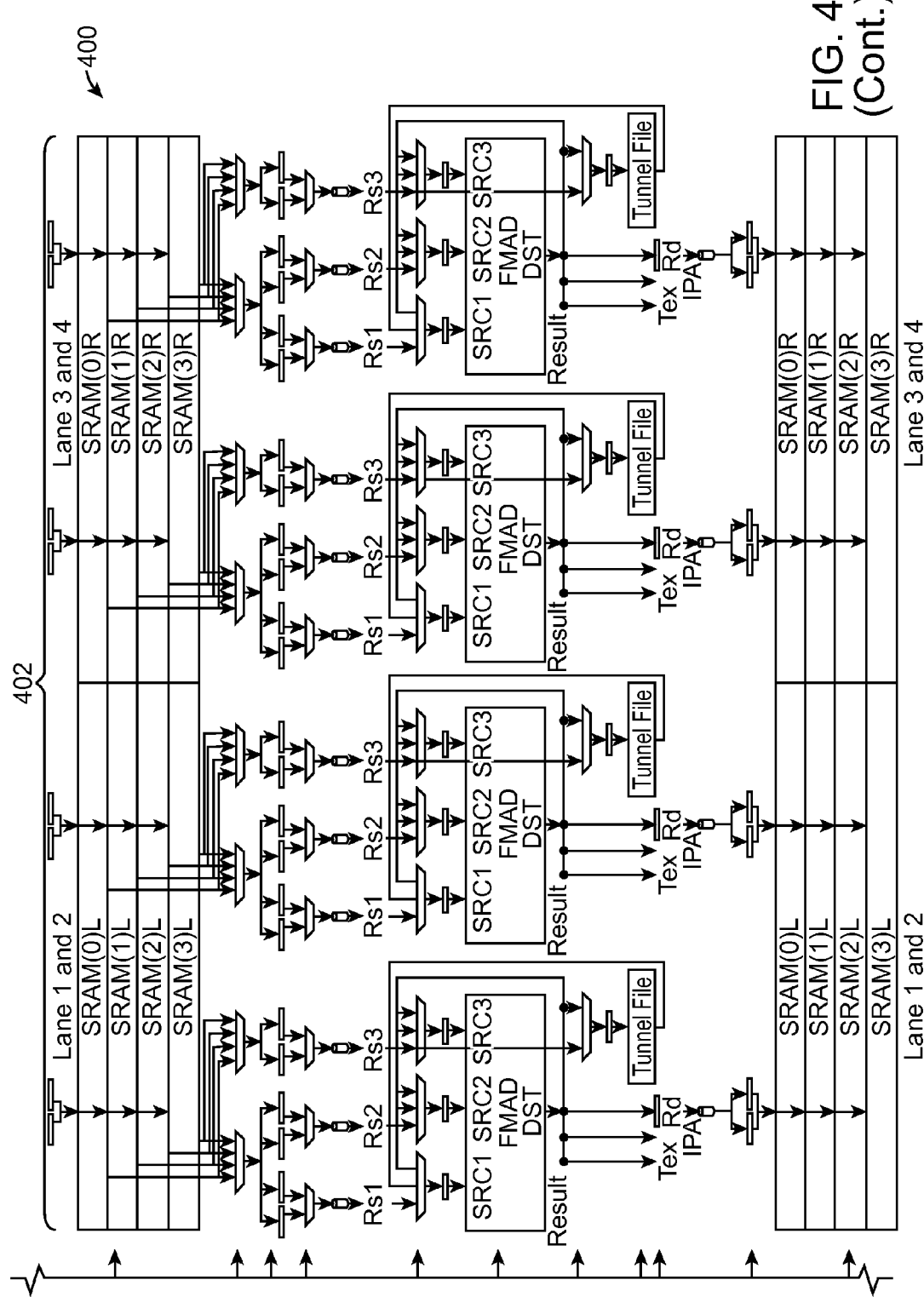

In one example embodiment, an Idle WARP may be assigned work units 305, assigned a shader program, and allocated a Register File 420 (FIG. 4). A shader constructor initializes a WARP by moving units of work 305 to the Register File 420, fixed function requests may be pre-processed, and then the WARP may be scheduled into execution. After Initialization WARPs toggle between the Waiting and Executing states until the end of the shader <program> at which time they return to the Idle state.

In one example embodiment, a WARP waits at a trace header. In one embodiment, the trace header contains the list of events that must take place before scheduling the WARP (back) into execution and resources required to run the trace to completion. Once the resources are available and the events have occurred, the WARP becomes a candidate. In one example embodiment, the WARP scheduler picks from among the contending WARP candidates for the next WARP to enter execution.

In one example embodiment, after the WARP is scheduled, the WARP scheduler preloads the Loop Buffer 410 (FIG. 4) by shipping the instructions in a trace from the instruction cache to the instruction decoder in the Loop Buffer 410. The instruction decoder decodes the instruction and places the decoded information into the Loop Buffer 410. In one example embodiment, once the trace is installed in the Loop Buffer 410, the WARPs may be scheduled.

In one embodiment, the WARP scheduler keeps track of which traces are loaded into the Loop Buffer 410 and skips the installation if the trace is already present. In one example embodiment, the WARP scheduler prioritizes WARPs pending on the same trace over WARPs pending on a trace yet to be loaded. In one embodiment, a WARP may be configured to perform several units of work 305. In one example embodiment, the WARP may begin interpolation and texture accesses prior to the start of the pixel shader program. In one embodiment, the register file allocation is deferred until these computations are ready to deliver values to the Register File 420 (FIG. 4). The Register File 420 is then allocated and parts of it are prefilled with input data. In one example embodiment, any required scalar data is also written into the scalar register file.

FIG. 4 shows an example processing element 400 architecture that may be used for implementing one or more embodiments. In one embodiment, the processing element 400 comprises of 8 lanes 401-402 of computation, a Register File 420, and a Loop Buffer 410. In one embodiment, the Loop Buffer 410 contains a small instruction cache, the instruction decoder and the instruction sequencer. In one embodiment, a register comprises a software value that may be delivered into computation and received from computation, and the Register File 420 is an organization of SRAM instances that holds registers.

In one example embodiment, the floating-point multiply-add (FMAD) units perform single precision floating point arithmetic instructions and are instrumental in micro-code implementing the transcendental instructions. In one embodiment, the Integer unit performs most integer arithmetic, logic operations, and memory address calculations. In one example embodiment, the BIT manipulation unit performs bit manipulation operations. In one embodiment, pipeline time flows strictly downward except for the two forwarding paths back to the computation unit input multiplexers. In one example embodiment, the structures at the top of the processing element 400 are the same packet data protocol (PDP) SRAM components as the structures at the bottom of the processing element 400. In one example embodiment, the upper PDP SRAM components are used to read operands and deliver them into computation, while the lower PDP SRAM components are used to write computed values back into the Register File 420.

In one embodiment, for the processing element 400 only four operand flip-flops may satisfy the needs of the collectors. In one example embodiment, both normal sequencing {Single Precision, Half Precision and Quarter Precision} and special functional units (SFU) sequencing {Double Precision and certain Integer instructions} may be satisfied by accessing the SRAMs slightly differently. In one example embodiment, the registers are used in even-odd pairs for the first two accesses and in even-even and odd-odd pairs on the second set of accesses, which complicate the control but saves the number of required multiplexors.

Figure 5:
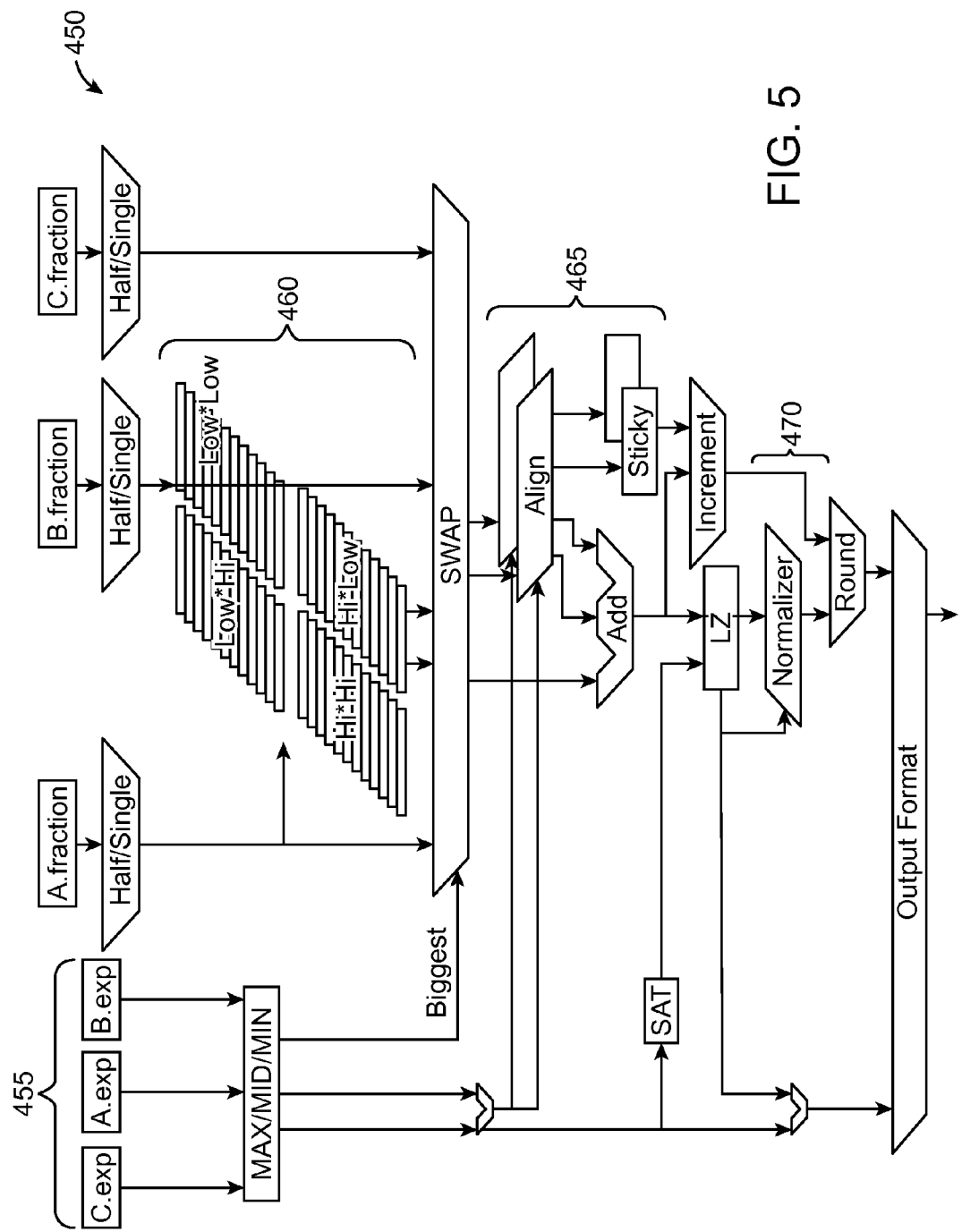
FIG. 5 shows an example SIMT architecture.

FIG. 5 shows an example SIMT architecture for an FMAD unit 450, which may be modified by one or more embodiments. The FMAD unit 450 is composed of a number of sections; the exponent section 455, the multiplication section 460, the accumulation section 465, and the normalization section 470. The multiplication section 460 is configured to perform 24-bit*24-bit unsigned multiplication, and to perform two 12-bit bit 12-bit unsigned multiplications. The result of these multiplications is in carry save format, using two bits to represent one binary value.

The accumulation section 465 is configured to perform the final addition from the carry save format multiplication and at the same time add in a third operand. The accumulation section 465 is 48 bits wide and results in a 48-bit result. Should the third operand cause massive cancellation of the high order bits, the lower order bits are renormalized back into the fraction bits. This protection enables code sequences such as:

A=X*Y
B=X*Y−A to have the property that A contains the properly rounded result of the multiplication, while B contains all of the bits that failed to make it into A. Thus:

A+B≡X*Y that is A+B contains all of the bits formed in the multiplication of X*Y. This reduces the cost of exact floating point multiplication arithmetic from 10 instructions to 2. This property is used in µCoding multi-precision arithmetic sequences.

The FAD3 instruction is the additive relation to FMAD in access to exact floating point arithmetic at low cost. This protection enables code sequences such as:

A=X+Y
B=X+Y−A to have the property that A contains the properly rounded result of the addition, while B contains all of the bits that failed to make it into A. Thus:

A+B≡X+Y

And no precision has been lost. This reduces the cost of exact floating point addition arithmetic from 6 instructions to 2.

The normalization section 470 finished the floating point calculation including renormalization of the fraction, rounding of the computed result, processing of NANs, Infinities, and denormals in lieu of delivering an improper result. The following are example instructions processed by the FMAD unit 450.

For the FMAD A*B+C instruction, the exponents of the multiplication inputs (A and B) are added (and de-biased) and then compared to the exponent of the addend (C). Should C be greater, the fraction associated with C is passed to the unshifted input of the accumulator; while the redundant output of the multiplier is passed to both shifter inputs, and both shifters are configured to shift the exponent difference between C and (A+B). Should C be less than, the fraction associated with C is passed to the second alignment shifter and that shifter is configured to shift by the exponent difference; while the redundant multiplier output is passed to the accumulator and through the other shifter, this one configured not to shift.

For the FMUL A*B instruction, the shifters are configured not to shift, and the SWAP multiplexor routes the multiplication to the accumulator input and through one shifter.

For the FADD A+B instruction, the exponents of the augends are subtracted and compared. The augend with the larger exponent passes directly to the accumulator, while the one with the lessor exponent passes through a shifter configured to align it with the larger augend.

For the FAD3 A+B+C instruction, the exponents are compared. The augend with the largest exponent is routed directly to the accumulator. The second largest exponent is routed through one shifter configured to align this augend to the largest augend. The smallest augend passes through the second shifter and is aligned to the largest augend.

For the FRACT instruction, this instruction aligns the binary point and throws away the integer part, delivering the remaining fractional bits.

For the FMAX, FMIN instructions, these instructions examine the exponents and fraction and deliver the larger (MAX) or smaller (MIN). In the case of a NaN, the non-NaN operand should be delivered. That is:

MAX(NaN, x)==x

For the CVT instruction, this instruction converts one data type to another. In Table 1 below, the vertical box is the source type, while the horizontal box is the destination type. In both cases, '00' represents a signed integer, '01' represents an unsigned integer, '10' represents a floating point value. F-Op is the conversion operation code (OpCode), conserving space in the Secondary OpCode name space.

TABLE 1

| F-OP | | |
|---|---|---|
| 0 0 0 0 | Signed | Signed |
| 0 0 0 1 | | Unsigned |
| 0 0 1 0 | | Float |
| 0 1 0 0 | Unsigned | Signed |
| 0 1 0 1 | | Unsigned |
| 0 1 1 0 | | Float |
| 1 0 0 0 | Float | Signed |
| 1 0 0 1 | | Unsigned |
| 1 0 1 0 | | Float |

Floating point results are subject to rounding. Integer conversions are also subject to rounding. The rounding specification is illustrated in Table 2.

TABLE 2

| B | RM | |
|---|---|---|
| | 0 0 0 | N/A |
| | 0 1 0 | Round Nearest Even |
| | 0 1 1 | Round Nearest Largest |
| | 1 0 0 | Round +∞ |
| | 1 0 1 | Round −∞ |
| | 1 1 0 | Round Towards Zero |
| | 1 1 1 | N/A |

Round to nearest even is the IEEE-754-1985 standard rounding mode. Given a result precisely between an odd number and an even number, choose the one that is even. Round to nearest largest is the IEEE 754-2008 rounding mode. Given a result precisely between two successive numbers, choose the one with the larger magnitude. Round to positive infinity rounds positive values up and negative values down, unless the result is precise. Here the inverse of the sign bit is added to the imprecise fraction. Round to negative infinity rounds positive values down and negative values up, unless the result is precise. Here the sign bit is added to the imprecise fraction. Rounds towards zero is simple truncation.

The B field specifies that the rounding is to take place at the lowest fraction bit or at the binary point. Rounding at the binary point supports floating point constructs such as the FORTRAN AINT, ANINT built in functions; where a floating point value is rounded at its binary point (if present) and the result remains in floating point format.

The FCMP and FCLASS instructions are floating point compare instructions and are processed by the integer unit by performing a sign magnitude comparison and a bit of logic to develop a TRUE or FALSE value. There are six comparisons available in each value format {signed integer, unsigned integer, and floating point}. If the floating point formats, a comparison with one operand a NaN results in a FALSE result, and comparisons between two zeros results in a TRUE result.

The floating point classify instruction is processed by the exponent path without need of the operand path except for an all zero check of the fraction bits. This instruction classifies floating point operands into five forms of three entries each: NaN, SNaN, and QNaN; Infinity, +Infinity, and −Infinity; Finite, +Finite, and −Finite; Denorm, +Denorm, and −Denorm; Zero, +Zero, and −Zero. The instruction delivers a TRUE or FALSE result.

The exponent section 455 may be configured to perform two partial precision exponent (5-bit) manipulations, one single precision exponent (8-bit) manipulation or one double precision exponent (11-bit) manipulation per pass. Both adders (e.g., Ling and McFarland adders) are based on 3-bit components, so combining 4 such sections allows mapping of the needs to the components. The partial precision exponents are processed in a pair of 6-bit paths, the single precision exponents are processed in a 9-bit path, while the double precision exponents are processed in a 12-bit path.

Since the exponents are biased quantities, the additions and subtractions must preserve the bias of the exponent, subtracting out the redundant bias when exponents are added and adding in the bias when exponents are subtracted. This organization of the exponent section 455 provides one extra bit of precision for each exponent range and simplifies some overflow, underflow and denormal handling. The exponent section 455 is in charge of detecting NaN, Infinity, and denormal operands, forming an appropriate response and when possible saving resources (e.g., processing power, processing area, memory, etc.) by not computing intermediate results when the result is known a priori.

The Carry Propagation network of the exponent adders in the exponent section 455 are enhanced to clip the carry chains at the appropriate boundaries based on the size of the operands being processed. The most critical job of the exponent section is to provide control to the SWAP network. SWAP routes the component with the largest exponent to the direct input to the adder, and the operands with lesser exponents thought the alignment shifters under shift counts based on the difference of the operand exponent to that of the largest exponent.

The exponent section 455 is responsible for providing a special bit to the leading zero detector. The purpose of this bit is to prevent the leading zero detector from normalizing a result up passed the point where a denormal number would be produced. This allows the output of the leading zero detector to be added to the exponent without fear of over normalizing a denormal number past the biased exponent=zero point.

After the normalization count is fed into the exponent section 455, the exponent is ready to be placed back into the proper container and delivered as a result. The exponent section 455 is also responsible for handling the sign bits of the operands and of the result. The instruction set provides the ability to negate or absolutize (or both) each input operand, saving instructions at the cost of some hassle in the processing of said instructions. Along with the exponent section 455 exponent manipulations, the instruction set keeps track of the signs and exercises sign control over operands entering the accumulator.

The Operand Multiplexor passes either 24-bit fractions into multiplication (or addition) or a pair of 11-bit partial precision fractions into multiplication (or addition). In one embodiment, during transcendental computations, the C012 coefficient table 650 (FIG. 6) are routed through the C input multiplexer. In one embodiment, the C3 table 630 is routed through the B input multiplexer, while the returning value comes through the Forwarding path through the A input.

There is a large multiplexer between the multiplication array 460 and the accumulation adder of the accumulation section 465 known as SWAP. This SWAP multiplexer is in charge of passing a pair of partial precision (12*12) multiplications to the accumulation adder. Alternately, the SWAP multiplexer may deliver the redundant product of the whole multiplication (24*24). In order to save power, the inputs to the unused multiplier sections are held constant. In addition, the compressor that adds the four partial precision arrays is preceded by a phase 2 latch. Should the multiplication be partial precision, the latch remains in the hold state so the compressor tree does not assert signals and thus waste power. Otherwise the latch is made transparent and the assertions from the multiplier tree proceed with little delay. The exponent section 455 is in charge (under Loop Buffer 410 (FIG. 4) control) of choosing which pieces of data pass to which output port of the SWAP multiplexor.

The bits shifted off the end of the two shifters are ORed together and form the sticky bit in the accumulation section 465. The sticky bit is used in rounding and in particular goes into the incrementer.

The incrementer performs rounding, and in one embodiment for transcendental calculations, the incrementer also performs re-centering of the reduced arguments.

The leading zero (LZ) detector scans the leading zeros of the output of the adder ORed with the saturation bit from the exponent section 455. The saturation bit is set on the bit that would be the hidden bit if a denormalized number was formed (in the accumulator) and this prevents the LZ detector from normalizing the accumulator fraction up past the point where the exponent would become denormal. The output of the LZ detector is used to control the normalization multiplexer and subtracted from the current exponent to form the final exponent.

The normalizer unit of the normalization section 470 takes the output of the LZ detector and up shifts fraction from the accumulator so that the highest significant bit occupies the position of the hidden bit. If the LZ detector finds a significant bit in the −1, 0, or +1 locations from the accumulator fraction, then rounding is to be performed and the result of the incremented is considered along with the accumulator fraction as the properly rounded result. Otherwise the output of the normalizer is the finished result.

Figure 6:
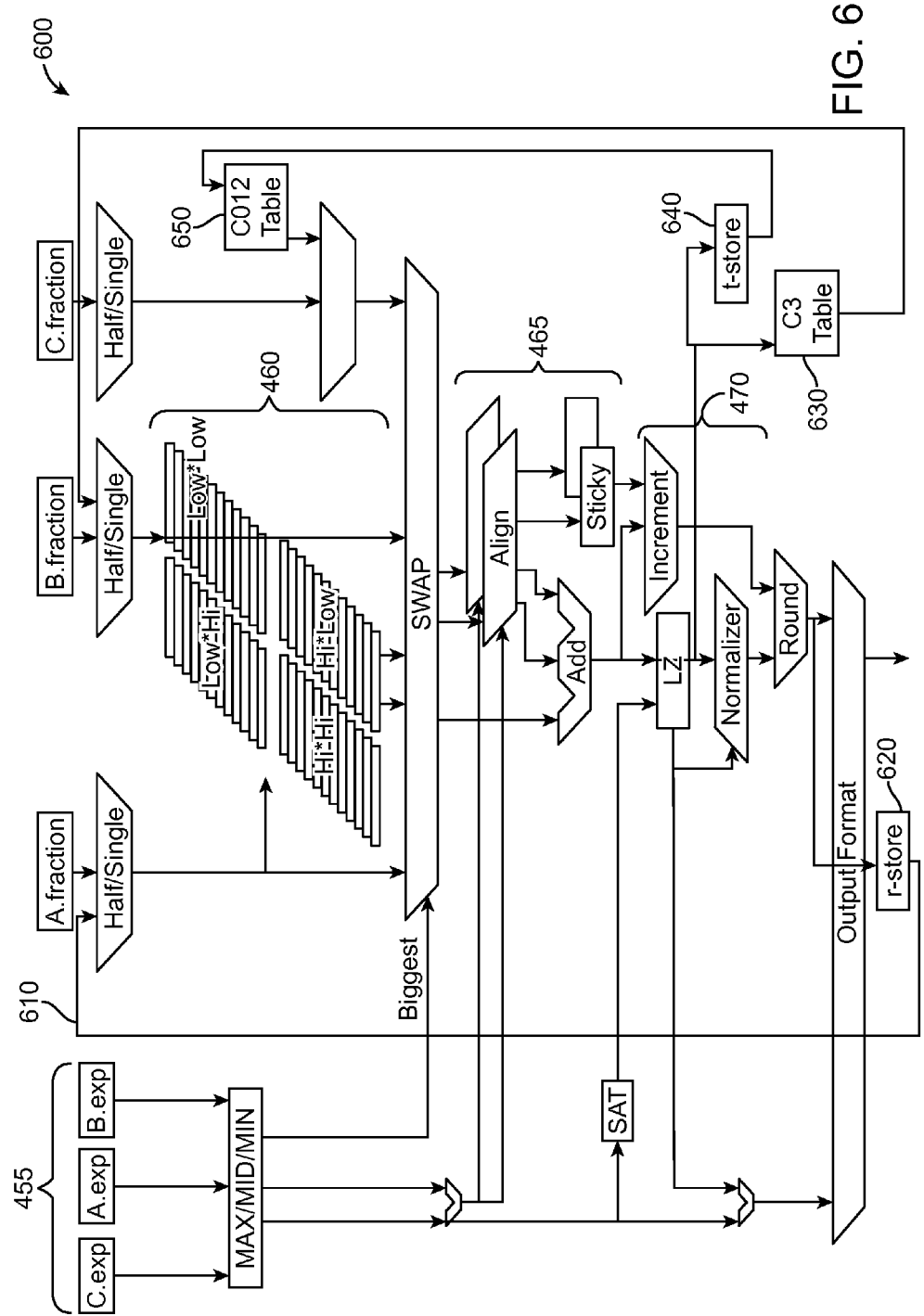
FIG. 6 shows an example SIMT transcendental micro-Architecture, according to an embodiment.

FIG. 6 shows an example SIMT transcendental microArchitecture for an FMAD unit 600, according to an embodiment. In one embodiment, the transcendental microArchitecture FMAD unit 600 includes the following additional structures from the example architecture 450 (FIG. 5): the C012 table 650, the C3 table 630, the t-store 640, and the r-store 620, along with the connections and flow directions as illustrated. In one embodiment, the r-store 610 is routed back via 610 to the A input of the multiplier. In one embodiment, the C012 table 650 includes the coefficients for the Horner evaluations. In one embodiment, the C012 table 650 is connected as an input to the adder (only) during evaluations and may be accessed while the multiplications are in progress.

In one embodiment, the C2 part of the C012 table 650 is accessed in the first Horner evaluation pass. In one embodiment, the C1 part of the C012 table 650 table is accessed in the second Horner pass. In one embodiment, the C0 part of the C012 table 650 is accessed in the final Horner pass. In one embodiment, each of the table portions (e.g., C2, C1 and C0) have a different operand width, and in one example embodiment the 'multiplexer' is constructed in OR-gate form and allows any bits the table produces to pass through.

In one example embodiment, the C012 table 650 may also be implemented in the direct path from the SWAP multiplexer to the adder first input (that does not go through the alignment networks). In one example embodiment, neither path is critical and both perform the same task (but the second option may use less power since the SWAP multiplexer is not utilized). In one embodiment, the C3 table 630 is accessed during the last clock cycle of the first pass of the instruction through the transcendental microArchitecture FMAD unit 600 so that the C3 coefficient is available at the start of the first Horner evaluation pass.

In one example embodiment, the t-store 640 is four 6-bit flip-flops or latches used to hold the table indexing function. The t-store 640 In one embodiment, micro-code supplies the cycle number and the transcendental number and together these three items uniquely identify the coefficients. In one embodiment, the t-store 640 is routed back to the C012 coefficient table 650, and controlled by the Loop Buffer 410 (FIG. 4). In one embodiment, the Loop Buffer 410 has a unary signal used to capture the table index into the t-store 640, and a unary control signal used to gate the t-store 640 value back into the C012 coefficient table 650. During all three passes, the Loop Buffer 410 holds constant the Transcendental function number (also used to index the C012 coefficient table 650).

In one example embodiment, the r-store 620 is four 32-bit flip-flops or latches used to hold the reduced argument which is then used three times during the Horner evaluation. In one embodiment, the r-store 620 is routed back to the A input of the multiplier section 460, and controlled by the Loop Buffer 410. In one embodiment, the Loop Buffer 410 has a unary signal used to capture the reduced argument into the r-store 620, and a unary control signal used to gate the r-store 620 value back into the A input operand source multiplexer.

In one embodiment, Transcendental instructions are processed by micro-code stored in the Loop Buffer 410. The first pass through the FMAD units (e.g., the transcendental microArchitecture FMAD unit 600 implemented in the architecture 400) is a pass used to reduce the argument into proper form for the Cubic interpolation steps. In one embodiment, in general this first pass manipulates the fraction bits, and finds an appropriate table index which is stored in the t-store 640; and along with this, the fraction is manipulated into the reduced fraction along with an exponent, which is then stored in the r-store 620.

In one embodiment, during the first pass, the exponent is manipulated, and for most Transcendental instructions, the exponent computed on this first pass does not need to be processed on the intermediate two passes; and is manipulated only during the normalization stage on the final pass. In one embodiment, during the two intermediate passes, the exponent section may be configured into a lowest power state. In one example embodiment, the first Horner evaluation pass computes the first Horner value (h1) from the C2 and C3 coefficients and the reduced argument r as follows: h1=C2[t]+C3[t]*r.

In one embodiment, the second Horner evaluation pass computes the second Horner value (h2) from h1, r, and C1 as follows: h2=C1[t]+h*r.

In one embodiment, the final Horner evaluation pass computes the purported result Rd from h2, r, and C0 as follows: Rd=C0[t]+h*r.

In one embodiment, two transcendental instructions have additional passes to add the integer part to the exponent (2x, ex), and one additional transcendental multiplies the computed result by a constant (1/ln 2(e)) to finish the computation (ln(x)).

Figure 7:
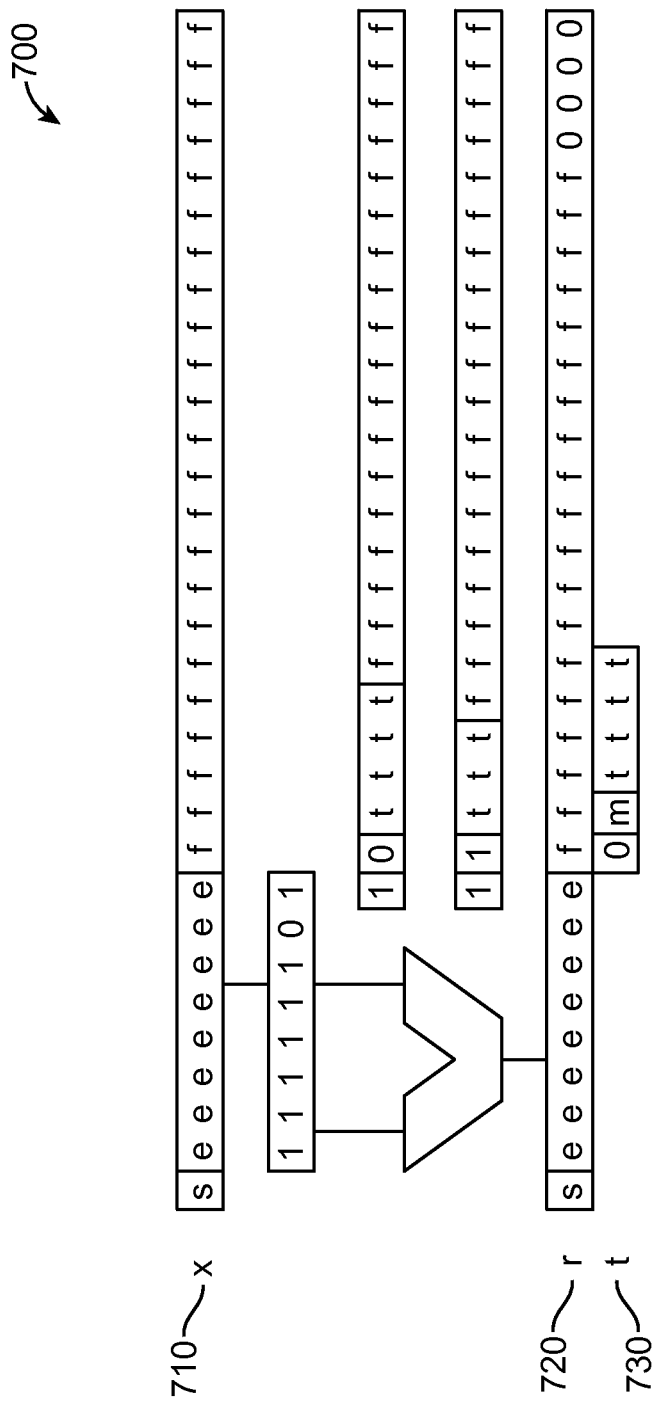
FIG. 7 shows an example reciprocate representation, according to an embodiment.

FIG. 7 shows an example reciprocate representation 700, according to an embodiment. Reciprocate is a very often used in computation in graphics processing, and is often used in place of divide. In one embodiment, reciprocation is processed under micro-code control in four (4) instruction equivalent cycles. In one embodiment, the results may be forwarded to the subsequent instruction, deposited into the tunnel file, or written back to the Register File 420 (FIG. 4) as needed.

In one embodiment, the reciprocal of ±zero=>±∞ and the reciprocal of ±∞=>±zero. The reciprocal of a NaN is a NaN. In one embodiment, the Reciprocation algorithm is based on Cubic interpolation performed as a Horner evaluation of a Taylor polynomial with Chebychev coefficients. In one example embodiment, for Pass 1: Reciprocation begins with the preprocessing of the exponent field 710 as illustrated in the example representation 700. In one embodiment, once the exponent 710 has been preprocessed it is not needed until the final polynomial evaluation cycle as this preprocessed exponent is within ±1 of the final true exponent.

In one embodiment, the fraction field is examined and moved to the t-store 640 represented at 730. In one embodiment, this field is used to index the coefficient tables. In one embodiment, the fraction is realigned to make up for the bits moved to the t-store 640. In one embodiment, if the high order bit of the fraction is a '1', the fraction is shifted up by 4 bits, if the high order bit of the fraction is '0' the fraction is shifted up by 5 bits. In one embodiment, this rearranged fraction (shown at 720) is stored in the r-store 620 and is used in the subsequent three cycles as a multiplier in the Horner evaluation sequence. In one embodiment, after the final Horner multiply and add are performed through the adder, the exponent is adjusted by the normalizer in order to finish the computation.

Figure 8:
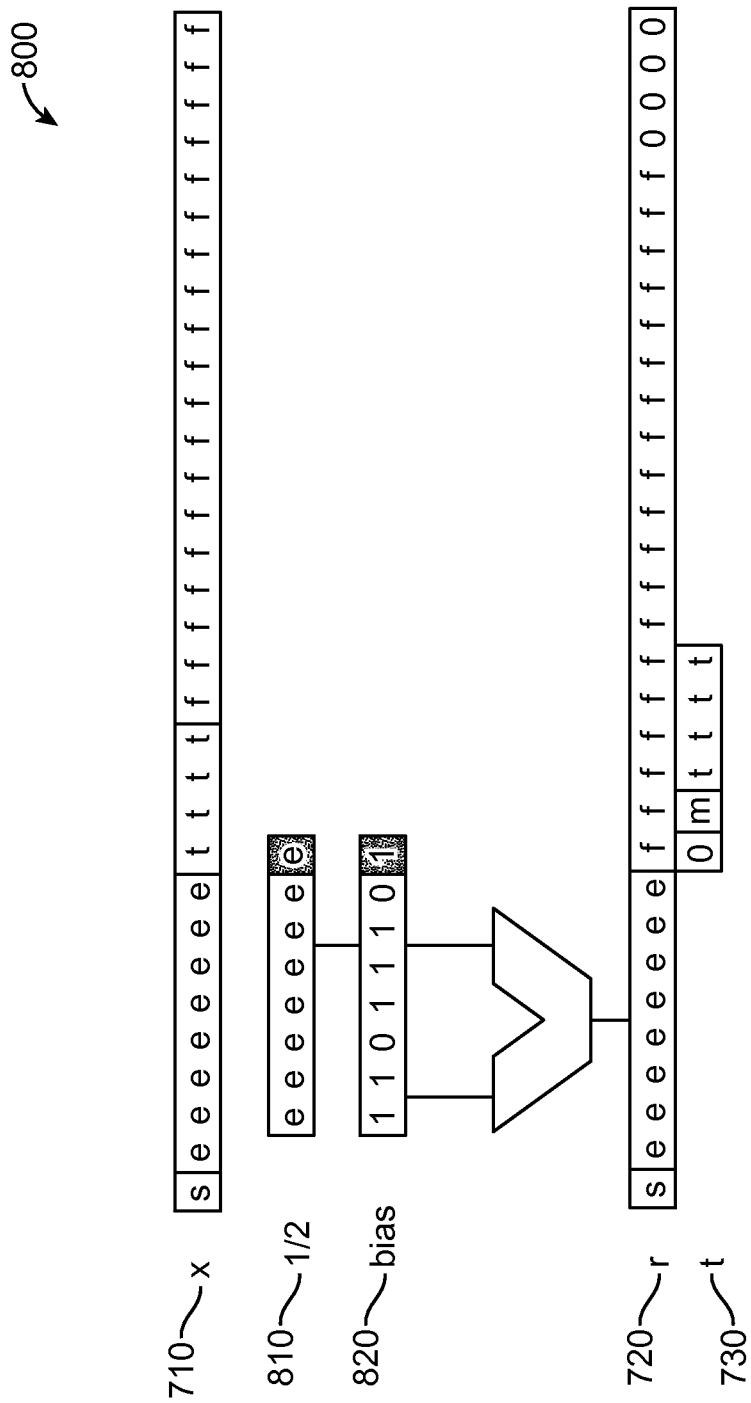
FIG. 8 shows an example reciprocal square root representation, according to an embodiment.

FIG. 8 shows an example reciprocal square root representation 800, according to an embodiment. In one embodiment, reciprocal square root extraction proceeds similarly as with reciprocation. In one embodiment, the reciprocal square root of +zero=>+∞ and the reciprocal square root of +∞=>+zero. In one embodiment, the reciprocal of a NaN is a NaN. In one embodiment, the reciprocal square root of −zero=>−∞, the reciprocal of any other negative number is NaN. In one example embodiment, for Pass 1: reciprocal square root extraction begins with the preprocessing of the exponent field 710 as illustrated in the representation 800.

In one embodiment, the low order bit of the exponent is moved to the t-store 640 as illustrated at 730 and chooses the range (coefficients) for the Horner evaluation. In one embodiment, once the exponent has been preprocessed it is not needed until the final polynomial evaluation cycle as this preprocessed exponent is within ±1 of the final true exponent. In one embodiment, the fields are illustrated for ½ 810 and for bias 820. In one embodiment, the high order 4 bits of the fraction field are moved to the t-store 640. In one embodiment, this field is used to index the coefficient tables of the C012 table 650. In one embodiment, the fraction is realigned to make up for the bits moved to the t-store 640. The fraction is shifted up by 4 bits. In one embodiment, the rearranged fraction is stored in the r-store 620 at 720 and will be used in the subsequent three cycles as a multiplier in the Horner evaluation sequence. In one embodiment, after the final Horner multiply and add are performed through the adder, the exponent is adjusted by the normalizer in order to finish the computation.

Figure 9:
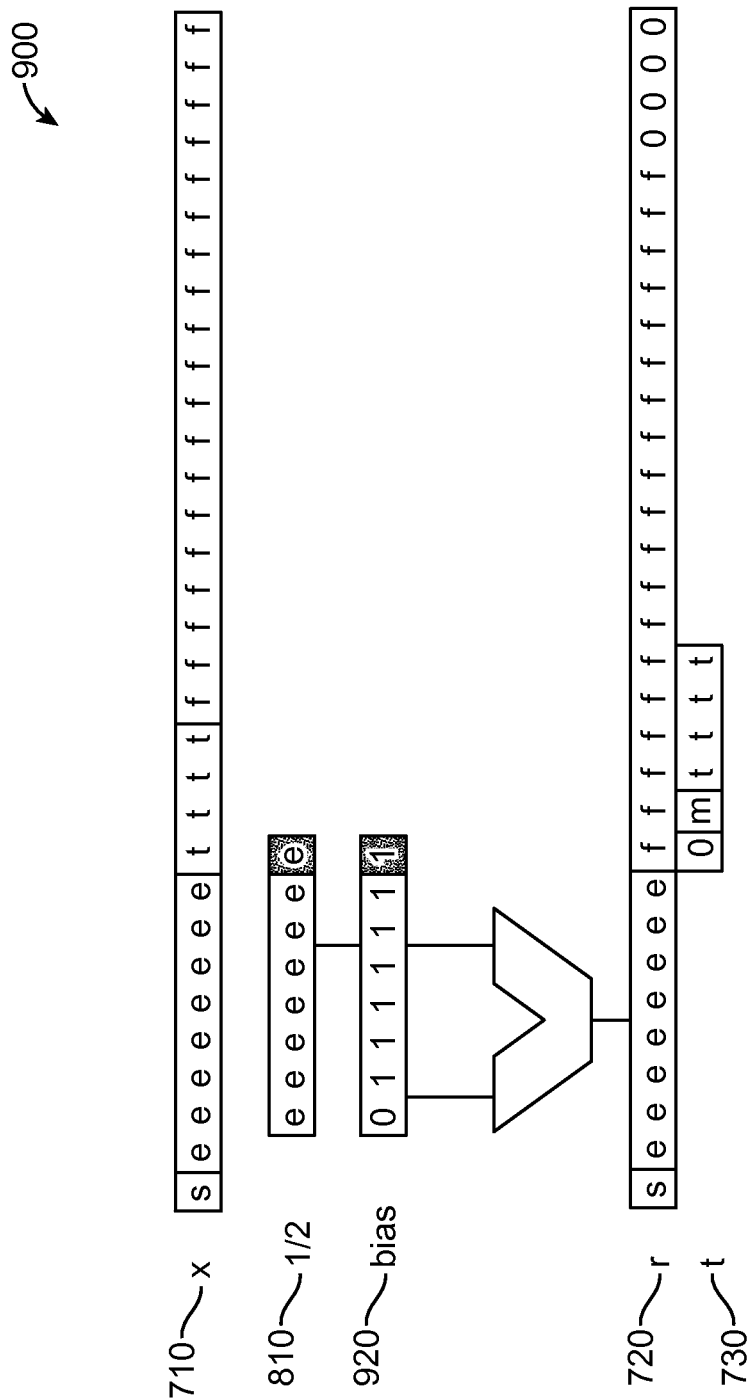
FIG. 9 shows an example square root representation, according to an embodiment.

FIG. 9 shows an example square root representation 900, according to an embodiment. In one embodiment, square root extraction proceeds similarly as with reciprocation. In one embodiment, the square root of +zero=>+zero and the square root of +∞=>+∞. The square root of a NaN is a NaN. In one embodiment, the square root of −zero=>−zero, the reciprocal of any other negative number is NaN. In one embodiment, for Pass 1: square root extraction begins with the preprocessing of the exponent field 710 as illustrated in the representation 900.

In one embodiment, the low order bit of the exponent is moved to the t-store 640 at 730 and chooses the range (coefficients) for the Horner evaluation. In one embodiment, once the exponent has been preprocessed it is not needed until the final polynomial evaluation cycle as this preprocessed exponent is within ±1 of the final true exponent. In one embodiment, the fields are illustrated for ½ 810 and for bias 920. In one embodiment, the high order 4 bits of the fraction field are moved to the t-store 640. In one embodiment, this field is used to index the C012 coefficient table 650. In one embodiment, the fraction is realigned to make up for the bits moved to the t-store 640. In one embodiment, the fraction is shifted up by 4 bits. In one embodiment, the rearranged fraction is stored in the r-store 620 at 720 and is used in the subsequent three cycles as a multiplier in the Horner evaluation sequence. In one embodiment, after the final Horner multiply and add are performed through the adder, the exponent is adjusted by the normalizer in order to finish the computation.

Figure 10:
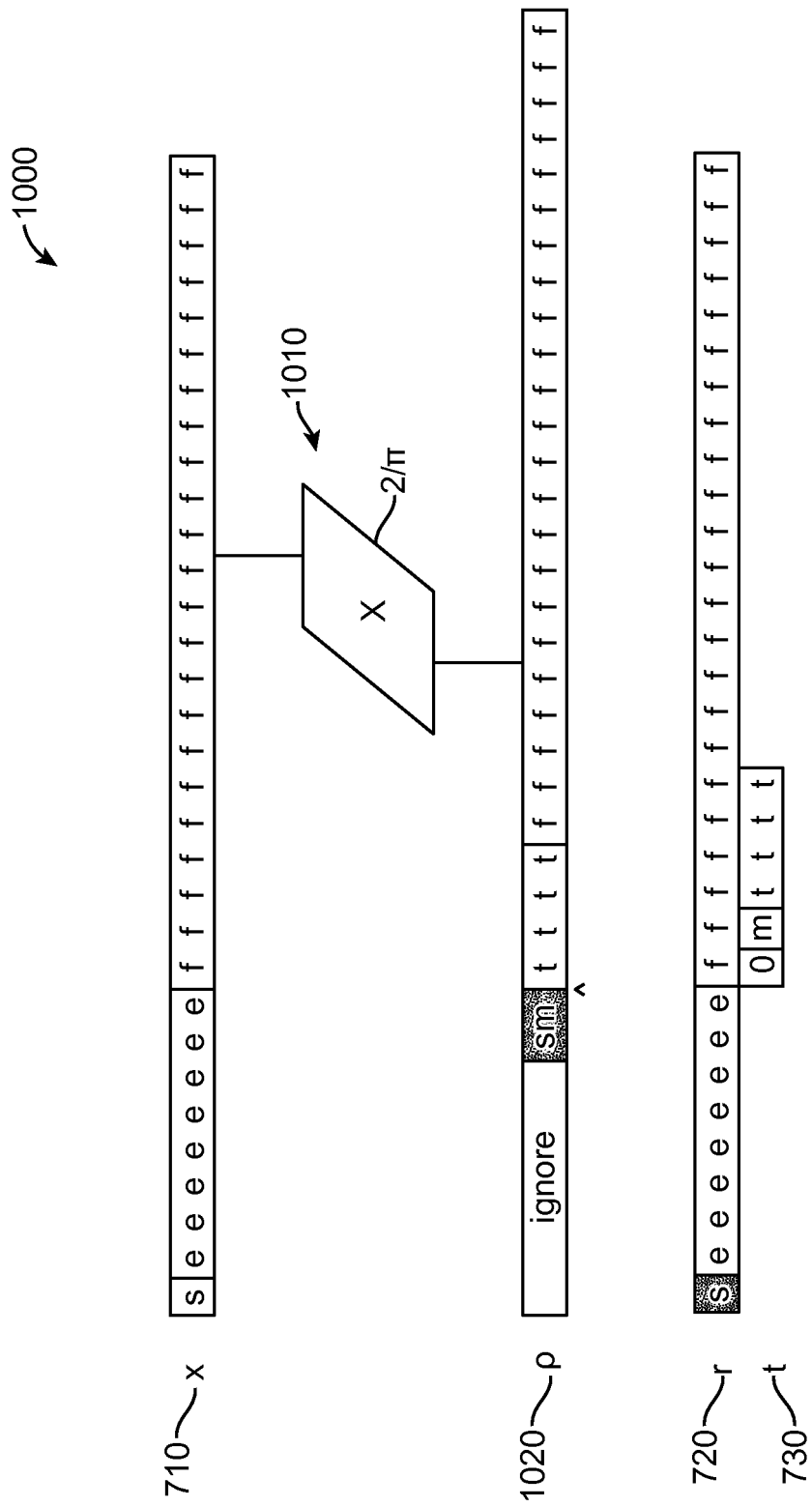
FIG. 10 shows an example sin function representation, according to an embodiment.

FIG. 10 shows an example sin function representation 1000, according to an embodiment. In one embodiment, Sin proceeds similarly as with reciprocation. In one embodiment, the sin(±∞)=>NaN. The sin(NaN)=>NaN. In one embodiment, for Pass 1: Sin processing begins with the multiplication of the argument with $2/\pi$ at 1010, as illustrated in the representation 1000. In one embodiment, the multiplication is then aligned to the binary point. In one embodiment, the 2 bits greater than the binary point become the sign of the result and an indicator that is needed to negate the fraction. In one embodiment, the four most significant bits below the binary point become the table index, and the fraction is then normalized without the table bits being present.

The processing includes computation for $\rho$ at 1020, and the fields are moved into the r-store 620 at 720 and to the t-store 640 at 730. In one embodiment, after the final Horner multiply and add are performed through the adder, the exponent is adjusted by the normalizer in order to finish the computation. In one embodiment, unlike the earlier transcendentals, the exponent 710 participates in the Horner evaluation. In one embodiment, the C1 table entry[0] of the C012 table 650 needs a full 23-bit fraction whereas the rest only need an 18-bit fraction.

In one embodiment, Cos proceeds similarly as with Sin, except that 1.0 is conceptually added to the result of the multiplication. In one embodiment, it is more energy efficient to perform an inversion of the m-bit and if the m-bit was a '1' then also perform an inversion on the s-bit:

m=−sm<0> s=sm<1>^sm<0>.

In one embodiment, for Pass 1: Cos processing begins exactly like Sin, and even uses the Sin coefficient tables. In one embodiment, the multiplication is aligned to the binary point. In one embodiment, the 2 bits greater than the binary point become the sign of the result and an indicator that is needed to negate the fraction, manipulated as expressed above. In one embodiment, the four most significant bits below the binary point become the table index, and the fraction is then normalized without the table bits being present. In one embodiment, after the final Horner multiply and add are performed through the adder, the exponent is adjusted by the normalizer in order to finish the computation. In one embodiment, unlike the earlier transcendentals, the exponent participates in the Horner evaluation.

Figure 11:
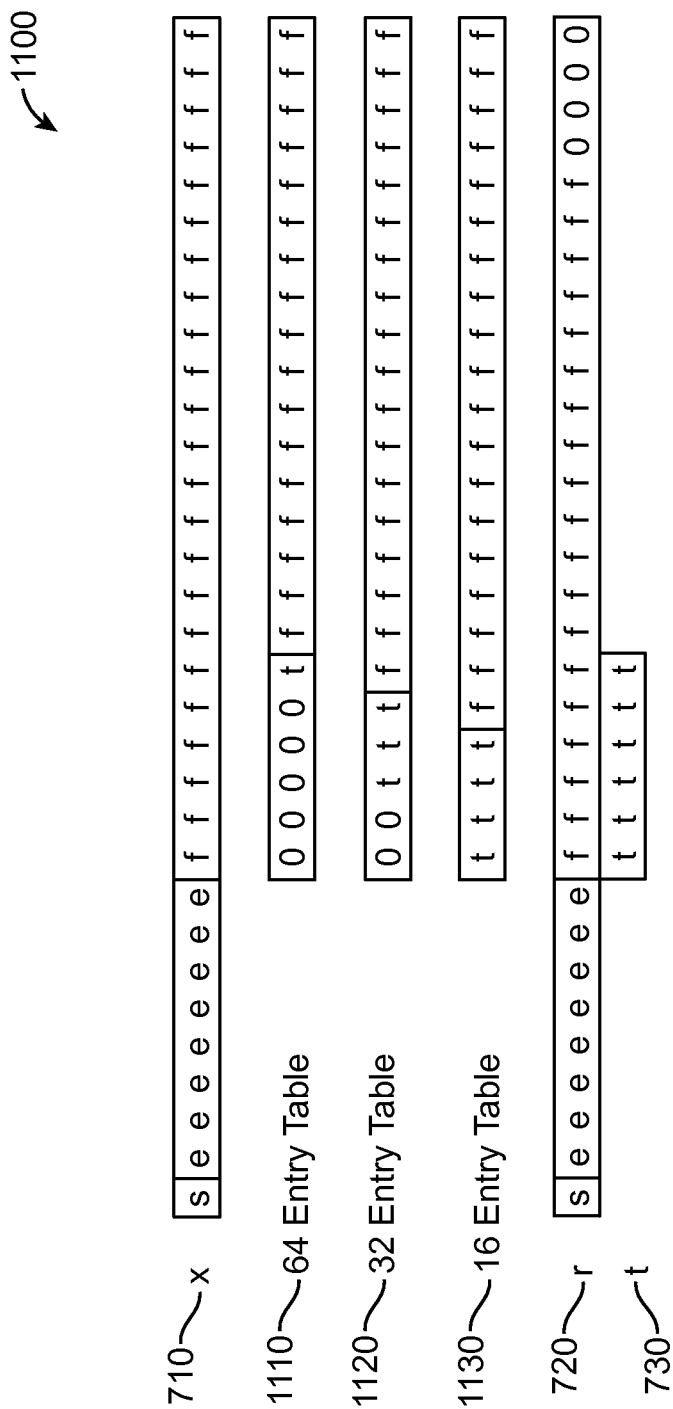
FIG. 11 shows an example ln 2(x) representation, according to an embodiment.

FIG. 11 shows an example ln 2(x) representation 1100, according to an embodiment. In one embodiment, base 2 logarithm extraction is based on the arithmetic identity:

$$\ln 2(x) \to \ln 2(1 \cdot f * 2 \wedge e)$$
$$\to \ln 2(1 \cdot f) + \ln 2(2 \wedge e)$$
$$\to \ln 2(1 \cdot f) + e$$

In one embodiment, the ln 2(+∞)=>+∞. The ln 2(NaN) =>NaN. The ln 2(±0)=>-∞. In one embodiment, the ln 2(-number)=NaN, and the ln 2(-∞)=>NaN. In one embodiment, for Pass 1: base 2 logarithm extraction begins with the examination of the fraction at 710 as illustrated in the representation 1100. In one embodiment, the top 6 bits of the fraction are moved to the t-store 640 at 730. In one embodiment, if the top 5-bits of the fraction were all '00000' then the fraction is left shifted by 6-bits, if the top 2-bits are both '00' then the fraction is left shifted by 5-bits, otherwise the fraction is left shifted by 4-bits.

In one embodiment, the processing continues through the 64 table entry at 1110, the 32 entry table at 1120 and the 16 entry table at 1130. In one embodiment, the rearranged fraction is stored in the r-store 620 at 720 and will be used in the subsequent three cycles as a multiplier in the Horner evaluation sequence. In one embodiment, after the final Horner multiply and add are performed through the adder, the exponent is adjusted by the normalizer in order to finish the computation. In one embodiment, for cycle 5: at this point the exponent field is added to the fraction field with respect to the binary position. In one embodiment, the output range of the previously computed fraction is [0.0 . . . 1.0), so computational accuracy is used when adding the debiased exponent to the fraction.

In one embodiment, for ln(x) the natural logarithm proceeds exactly like the base 2 logarithm except that the argument is multiplied by 1/ln 2(e) under the arithmetic identity:

ln(x)=ln 2(x)*1/ln 2(e).

In one embodiment, in this case when it comes to normalizing the fraction after the removal of the t-bits, there are bits output of the multiplication that shift up into the vacated positions, improving accuracy at essentially no computational cost. In one embodiment, the Horner evaluation takes the same number of cycles as the base 2 logarithm and excepting for the multiplication, the sequence is identical, including the tables being indexed.

In one embodiment, for log(x) the natural logarithm proceeds exactly like the base 2 logarithm except that the argument is multiplied by 1/ln 2(e) under the arithmetic identity:

log(x)=ln 2(x)*1/ln 2(10).

In one embodiment, in this case, when it comes to normalizing the fraction after the removal of the t-bits, there are bits output of the multiplication that shift up into the vacated positions, improving accuracy at essentially no computational cost. In one embodiment, the Horner evaluation takes the same number of cycles as the Base 2 logarithm and excepting for the multiplication, the sequence is identical, including the tables being indexed.

Figure 12:
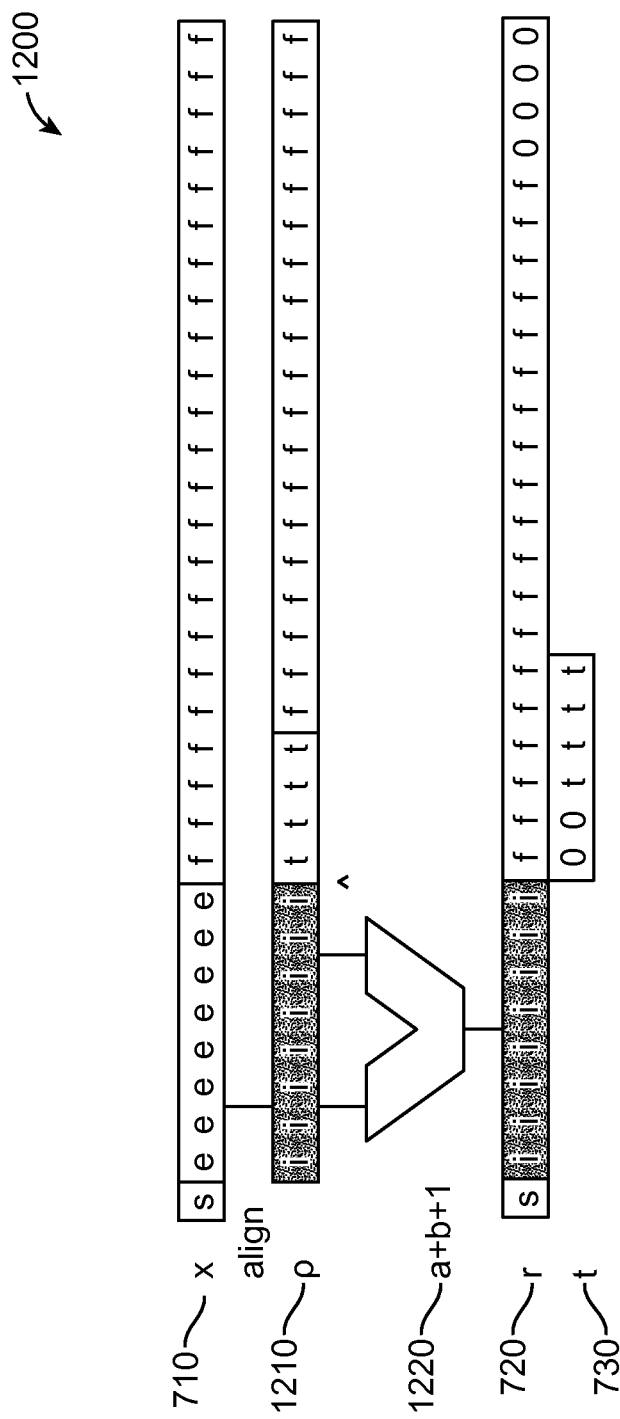
FIG. 12 shows an example 2**x function representation, according to an embodiment.

FIG. 12 shows an example 2x function representation 1200**, according to an embodiment. Base 2 exponentiation is based on the following arithmetic identity:

$$2 \wedge x \to 2 \wedge (int + fract)$$
$$\to 2 \wedge int * 2 \wedge 0 \cdot fract)$$

-continued $$0 \cdot fract \quad [0.0 \ldots 1.0)$$
$$2 \wedge 0 \cdot fract \quad [1.0 \ldots 2.0)$$

In one embodiment, the 2^(-∞)=>+0, 2^(+∞)=>+∞, 2^(NaN)=>NaN. In one embodiment, for Pass 1: base 2 exponentiation begins with the alignment of the fraction to the binary point so that the integer parts and the fractional parts may be separated. In one embodiment, once separated, the integral part is added to the exponent. In one embodiment, the processing proceeds for determining ρ at 1210, and a+b+1 at 1220. In one embodiment, the fractional part has its high order 4 bits removed and placed in the t-store 640 at 730, the remaining bits become the normalized fraction and stored in the r-store 620 at 720, as illustrated in the representation 1200. In one embodiment, after the final Horner multiply and add are performed through the adder, the exponent is adjusted by the normalizer in order to finish the computation.

In one embodiment, for e**x natural exponentiation is based on the following arithmetic identity:

e^x=2^(x*ln 2(e)).

In one embodiment, the argument to this transcendental is multiplied by ln 2(e) and then the fraction is aligned to the binary point. In one embodiment, once aligned to the binary point the rest of this transcendental is identical with the base 2 exponentiation transcendental including the tables.

In one embodiment, for 10**x base 10 exponentiation is based n the following arithmetic identity:

10^x=2^(x*ln 2(10)).

In one embodiment, the argument to this transcendental is multiplied by ln 2(e) and then the fraction is aligned to the binary point. In one embodiment, once aligned to the binary point the rest of this transcendental is identical with the base 2 exponentiation transcendental including the tables.

In one embodiment, The Loop Buffer 410 (FIG. 4) contains an instruction store, the micro-code instruction table, the instruction decoder, and interfaces to various external components. In one example embodiment, instructions are decoded after fetching them from the instruction store. In one embodiment, the current instruction set is easily decoded. In one embodiment, the Loop Buffer 410 maintains complete control over the computation pipeline. In one embodiment, the calculation pipeline comprises several components receiving commands and timing from the Loop Buffer 410.

In one embodiment, an instruction is fetched from the Instruction Store, decoded, and then passed down the 15 stage pipeline. In one embodiment, however, most of the stages in the pipeline are held constant over four cycles. In one embodiment, in this view, the pipeline is only four stages long. In one embodiment, fields of the decoded instruction are dropped after they are used by the pipeline. The 4-beat view is also known as a pass. In one embodiment, there is one flip-flop used to stage new information into the data-path on a pass basis. The intermediate stages are driven by three 2-input multiplexers that choose between the predecessor and successor flip flops controlled by a 2 bit counter.

In one embodiment, the Loop Buffer 410 maintains two sets of instruction counters. In one embodiment, the first is used to sequence instructions down the pipeline, while the second is used to sequence micro-coded instructions down the pipeline. In one embodiment, the counter is disconnected from the address from which the instruction resides in memory or the cache hierarchy. In one embodiment, when a micro-coded instruction is decoded, the instruction counter sequences the required data into computation, and the pipeline is "taken away" and given to the micro-code counter. In one embodiment, instructions already in the pipeline continue on through the pipeline. In one embodiment, on the penultimate pass of micro-coded execution, the pipeline is "given back" to the decoded instruction counter to sequence results back into the tunnel file, or Register File 420 (FIG. 4). In one embodiment, the micro-code results are available on the forwarding path to the next decoded (or micro-coded) instruction.

FIG. 13 shows example OpCode table entries 1300, according to an embodiment. As shown, the table entries 1300 include columns for instructions 1310, major OpCodes 1320 and 1330 and Minor OpCodes 1340.

In one embodiment, the instruction store contains a small SRAM of instructions. In one embodiment, prior to decode, each instruction is 64-bits in size. In one embodiment, as instructions are entered into the instruction store, they are examined to see if the instruction is a member of the activating class of instructions. In one embodiment, if so, a bit is set in the Activate scan lint. In one embodiment, an activating instruction is detected when the OpCode has any of the entries listed in the OpCode table entries 1300.

In one embodiment, the instruction decoder receives instructions from the instruction store, decodes them and pipelines them down the instruction pipeline. In one embodiment, the instruction decoder is capable of decoding one instruction per cycle. In one embodiment, with the current instruction set, the decoder's work is rather simple and straightforward. In one embodiment, most of the work is conditionally moving a field from the instruction to the appropriate field of the decoded instruction after detecting a few fixed bit patterns.

In one embodiment, the Size and Group specifiers denote the size of the operands and results, along with which part(s) of the execution mask that govern the execution of this instruction. In one embodiment, there is a 5-bit Major OpCode in every instruction. In one embodiment, should the instruction require a large immediate, then this field becomes the OpCode of the instruction and a 32-bit immediate is available in support of the instruction. In one embodiment, when the Major OpCode 1330 has the pattern '01010' then the Secondary OpCode becomes the OpCode and any immediate data is multiplexed out of the second word from two patterns: the bit field pattern (S-OP has the pattern '001010') or the Shuffle pattern (S-OP has the pattern '010100') or the memory pattern (S-OP has the pattern '01100x').

In one embodiment, compare instructions and logical instructions contain the Flow-OpCode. In one embodiment, the Flow OpCode performs an optional data manipulation of the Execution Mask and modification of the calculated value delivered to the Scalar register. In one embodiment, this same field is used in Bit manipulation instruction to define which bit manipulation instruction is to be processed. In one embodiment, transcendental instructions contain a microcode instruction routine <starting point> T-OP. In one embodiment, operands are specified by the source register specifier and by an operand modifier. In one embodiment, this field may specify a register from the Register File 420 (FIG. 4) where each lane of calculation uses a different value, a Scalar or Constant Scratch register used by all members of the WARP identically, the Tunnel supplies each lane individually, or forwarding where the current result is consumed immediately as an operand.

In one embodiment, instructions with 3-register operands are required to access not more than two registers with the others coming from Scalar, Constant Scratch, Tunnel, or Forwarding. In one embodiment, the decoder decodes the register fields and then determines which register file access to route to which operand port. In one embodiment, instructions with immediates have the immediate <possibly> reformatted so that it fits on the operand bus from the Loop Buffer 410 (FIG. 4) in the expected bit pattern. 32-bit <large> immediates are used directly, bit manipulation immediates have instruction<31:27> moved in to immediate<11:6>, shuffle instructions have bits instruction<31:27> moved into immediate<23:18>, and memory reference instructions have instruction<31:24> moved to immediate<16:9>.

Operand modifiers are either copied from their instruction locations directly, or they can be set to '00' if the operand is not subject to modification. If an operand register specifier does not exist on a particular instruction, the corresponding field is set to '00'. In one embodiment, the Scale and Saturation fields are either copied directly or set to '00' and '0' if the instruction has no use of the Scale or Saturate functionality. In one embodiment, the instruction rounding mode is either copied directly or set to '000' for instructions where the rounding mode is not defined.

In one embodiment, results are specified by the destination register specifier, the Scale specifier, and the Saturation Specifier. In one embodiment, this field may specify that the computed result be stored in the register file, stored in the tunnel file, consumed immediately by forwarding, delivered to the Texture Coordinate Buffer, or delivered to the Emit Buffer. In one embodiment, after decoding the 64-bit instruction occupies about 100-bits; 68 of these bits are the fully decoded field specifiers used to control the data path, the other 32 are the formatted immediate specified in the instruction; and 37-bits are stripped off after operand delivery and any immediate is discarded. In one embodiment, 13-bits control the operation(s) being performed and are discarded as result delivery begins, and 12-bits control result delivery.

Figure 14:
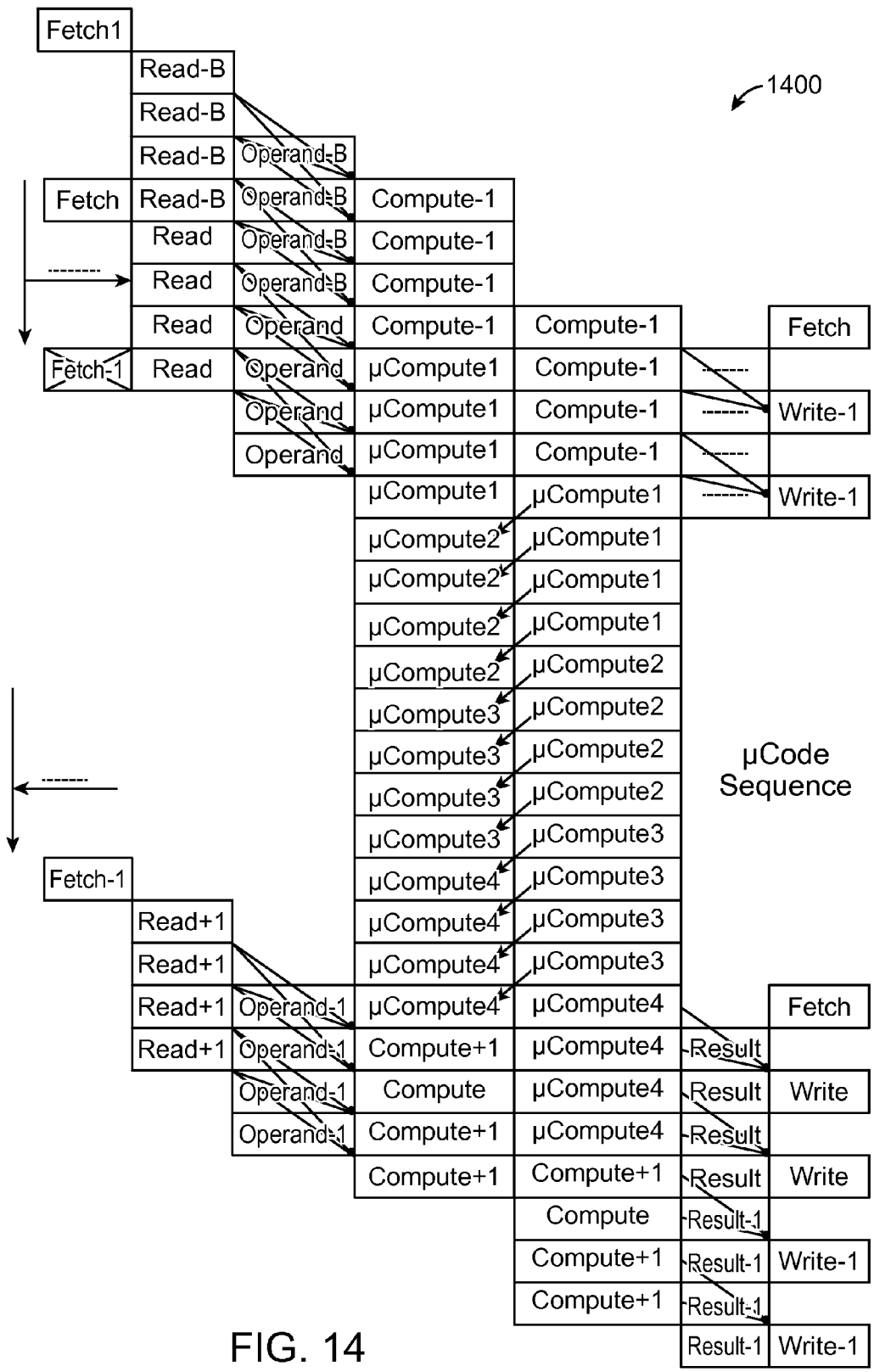
FIG. 14 shows an example micro-code pipeline, according to an embodiment.

FIG. 14 shows an example micro-code pipeline 1400, according to an embodiment. In one embodiment, certain instructions are more complicated than the calculation units can deal with in a single pass down the pipeline. In one embodiment, these instructions are micro-coded. In one embodiment, the micro-code pipeline 1400 shows a first normal instruction executing down the pipeline, a second micro-coded instruction executing down the pipeline, and a final normal instruction executing down the pipeline. In one embodiment, shortly after the micro-coded instruction is decoded, the pipeline is taken over by micro-code. In one embodiment, 1½ instructions before the micro-coded sequence ends, the pipeline is "given back" to normal instruction sequencing.

In one embodiment, the micro-code pipeline 1400 shows four instruction passes of micro-code execution. In one embodiment, the take-over and give-back sequencing may deal with sequences as short as two instruction passes and unbounded long instruction passes.

In one embodiment, the micro-code instruction store contains execution control signals used to govern long running computations, and is placed adjacent to the computation section of the decoded instruction store. In one embodiment, current micro-code is 28 μInstruction long and 68-bits to control instructions and 32-bits of immediate (as needed.) In one embodiment, micro-code instructions e^x, 10^x, sin(x), cos(x), ln(x), and log(x) require that immediate fields contain ln 2(e), ln 2(10), 2/π, 1/ln 2(e), and 1/ln 2(10), respectively.

In one embodiment, for fine grained clock gating the register file's 420 (FIG. 4) flip-flops (collectors) are controlled by the Read and Write enable bits generated in the Lane control unit (e.g., the Execution Mask). In one embodiment, only the sub-components of each register that are active are captured. In one embodiment, the ports to the Register File 420 are fine grain clock gated by the enablement's of the Load and Store ports to the Register File 420. In one embodiment, the computation units receive fine grained clock gating information from a table in the Loop Buffer 410. In one embodiment, the instruction OpCode to be executed in the computation unit indexes this table and a vector of clock gates are produced. In one embodiment, these control signals are asserted on clocked flip-flops and at clock distribution nodes to save power. In one embodiment, these control signals are used to shut down the computation sections that are not needed on an instruction by instruction basis and to avoid gating flip-flops which will not be used in the delivery of the result.

In one example embodiment, the fine grained clock table is about 40 bits wide, one bit for each flip-flop in the computational unit along with a few bits that indirectly control data-dependent fine grained clock gating. In one embodiment, micro-code also uses this same fine grained clock gating table. In one embodiment, the result OUT port of the PE is clock gated at all times except when the instruction is delivering data to the OUT.

Figure 15:
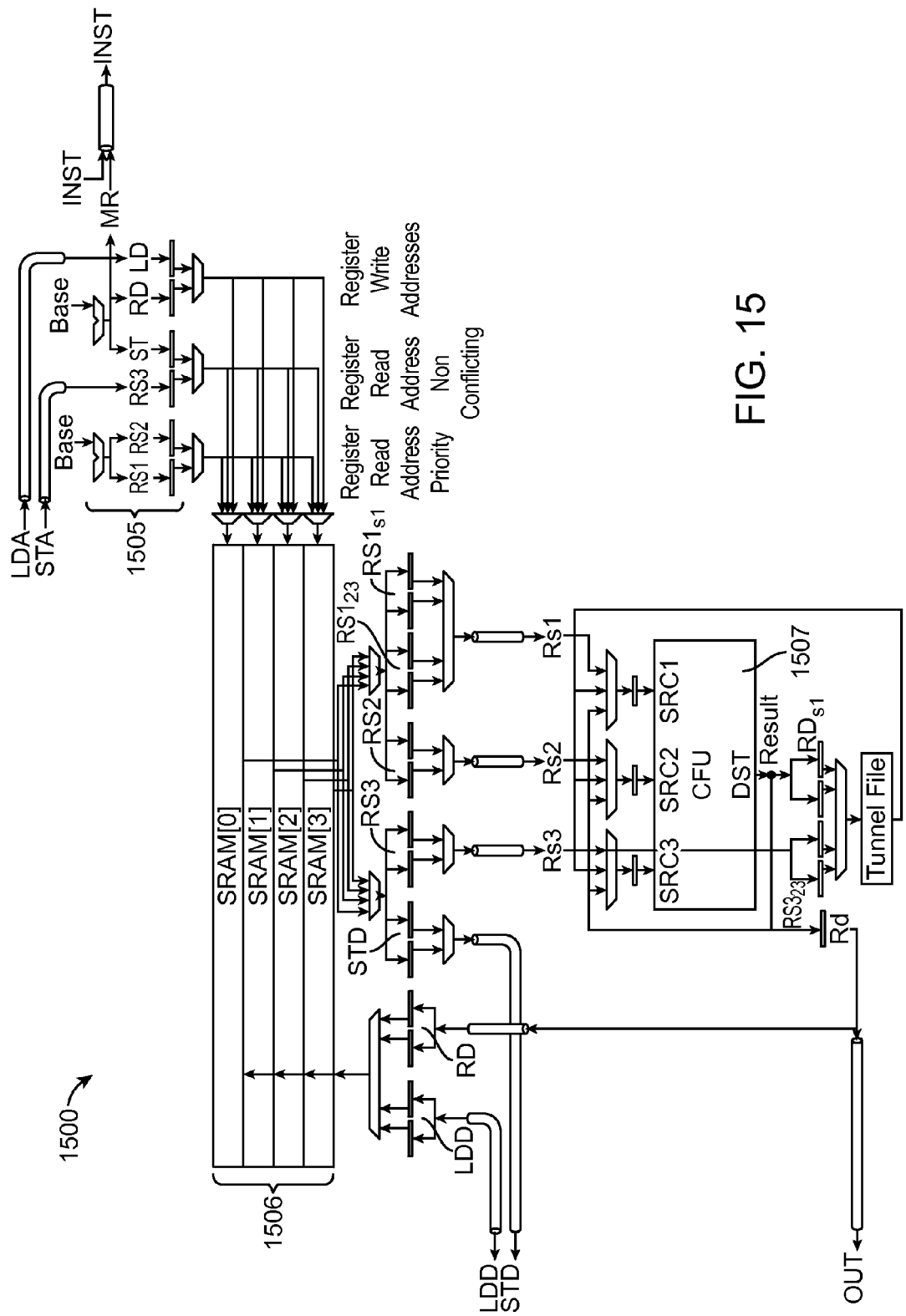
FIG. 15 shows an example processing structure with a register file sequencer, according to an embodiment.

FIG. 15 shows an example processing structure 1500 with a register file sequencer and control functional unit (CFU) 1507, according to an embodiment. In one embodiment, the register file sequencer runs the accesses to the Register File 420 (FIG. 4). In one embodiment, this included instruction accesses, Load Store accesses. In one embodiment, Load Store may access the Register File 420 in order to set up a WARP for scheduling. In one embodiment, the register file sequencer selects which SRAMs 1506 process which pending requests and on what cycle. In one embodiment, there are six requests 1505 that can be pending, 4 read requests and 2 write requests. In one embodiment, the sequencer chooses among these candidates and then routs the address to the appropriate SRAM 1506 which will perform the access.

In one example embodiment, for normal sequence the SRAM is composed of Pseudo Dual Ported SRAMs 1506 timed so that Read accesses occur on the high portion of the clock while write accesses are performed on the low part of the clock. In one embodiment, the RS1 Register File Read is guaranteed to access the SRAM 1506 of its choosing in the first cycle of instruction execution. In one embodiment, the RS2 register file Read is guaranteed to access the SRAM 1506 of its choosing in the second cycle of instruction execution. In one embodiment, the RD register file Write is guaranteed to access the SRAM 1506 of its choosing in the 12$^{th}$ cycle of instruction execution while the LD register file Write is guaranteed to access the SRAM 1506 of its choosing in the 13$^{th}$ cycle of instruction execution. In one embodiment, when the RS3 port is required, RS3 is guaranteed by the compiler not to SRAM instance conflict with the RS2 guaranteed access.

In one embodiment, Store Data Reads are performed when the SD addresses accesses an SRAM 1506 instance other than that accessed by the RS1 access. In one embodiment, should there be no RS1 access, the Store Data access will be performed. In one embodiment, all accesses are associated with Read and Write Enable bits which control which bits are read and which bits are written. In one embodiment, each control bit governs 8-data bits. In one embodiment, all accesses take place over 4 cycles over busses 256-bits wide. In one embodiment, internally the SRAMs 1506 are read and written 512 bits at a time and captured in flip-flops topologically close to the SRAM instances. In one embodiment, instruction register specifiers are relocated by adding in the base address stored in the WARP data structure. Memory reference register addresses are also relocated, and the 9-bit relocated register address is sent to the Load Store Unit. When the Load or Store is ready with data, this relocated register address is delivered to the LD or SD port of the register file sequencer.

In one embodiment, the double precision sequence proceeds much like the normal sequence addressed above, except that the sequence occurs over 8 cycles instead of 4, and the Register File 420 (FIG. 4) is accessed such that the more significant and lesser significant operands of a double precision operand follow each other on the operand busses. In one embodiment, pairs of SRAMs 1506 are read each cycle the lesser SRAM supplies RS1.hi while the greater SRAM supplies RS1.lo. In one embodiment, in the second cycle, again, the lesser SRAM supplies RS2.hi while the greater SRAM supplies RS2.lo. Results follow a similar pattern, ½ of a pair of SRAMs is written. In one embodiment, this Double Precision access pattern requires 4 flip-flops at the operand collector. RS1.hi and RS1.lo must have arrived before RS1.hi and RS2.hi can be sent to be followed by RS1.lo and RS2.lo.

Figure 16:
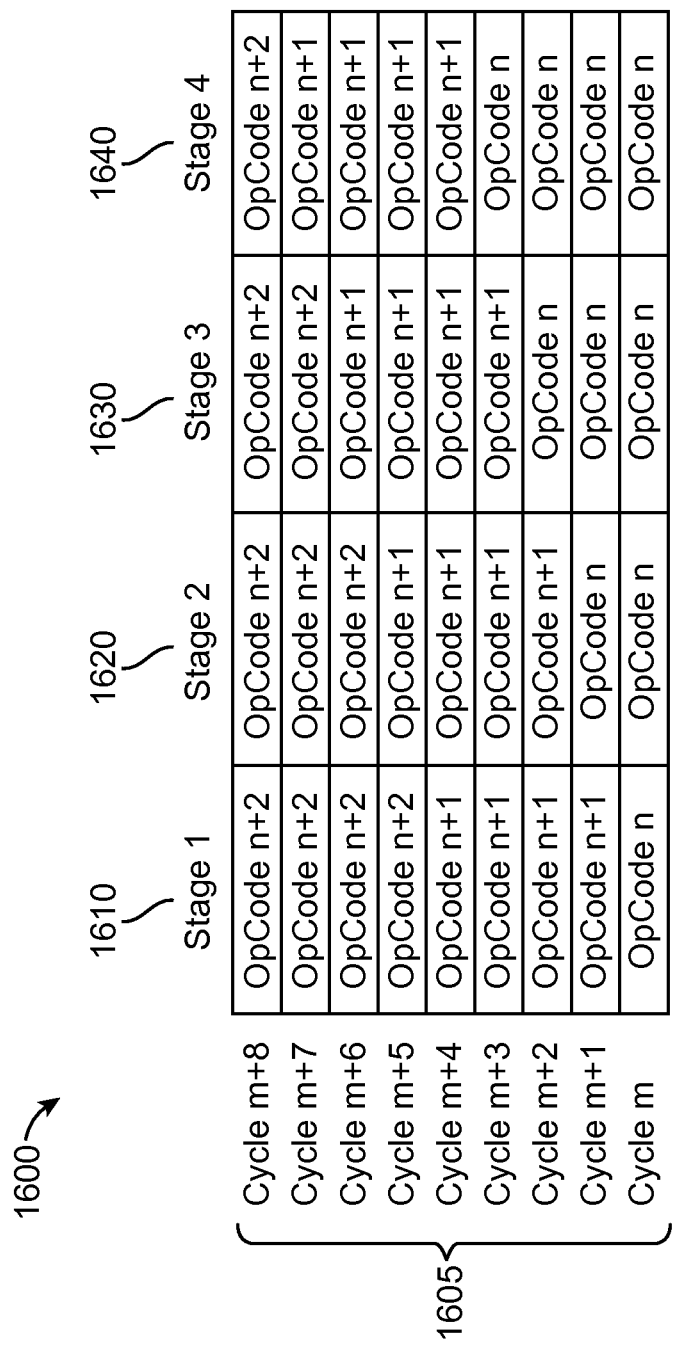
FIG. 16 shows an example four stages of calculations over a number of cycles, according to an embodiment.

FIG. 16 shows an example 1600 for four stages (Stage 1 1610, Stage 2 1620, Stage 3 1630 and Stage 4 1640) of calculations over a number of cycles 1605, according to an embodiment. In one embodiment, the data path sequencer runs the data flow (routing) controls between the Register File 420 (FIG. 4) and the computation units, and delivers the control signals to the computation units. In one embodiment, the data path sequencer unit governs the tunnel accesses and the forwarding network. In one embodiment, the computation units are controlled by an OpCode which is held constant over 4 cycles per stage of the computation pipeline, and staged to the intermediate stage of an instruction pass. In one embodiment, the OpCode bits are accompanied by the clock gating control bits.

In one embodiment, there are two OpCode flip-flops known colloquially as the predecessor and the successor. In one embodiment, the three intermediate stages are driven from three 4-way multiplexers controlled by 2-bit counters. This sequencing minimizes the flip-flops while eliminating the need of the function unit from performing this work. In one embodiment, the work performed is distributed over the 8 lanes of computation (e.g., 401/402, FIG. 4). In one embodiment, example 1600 illustrates how the four stages of calculation see OpCode over a number of cycles.

In one embodiment, there are three 7-bit counters accessing the various stages of instruction execution stored in the instruction buffer. In one embodiment, the first counter represents the instruction reading the Register File 420 (FIG. 4) getting ready to begin execution. In one embodiment, the second represents the instruction being executed. In one embodiment, the third represents the instruction writing its results back to the Register File 420. In one embodiment, micro-code has its own counters so that the instructions may be properly frozen allowing micro-code to take over the pipeline and later give it back power efficiently. In one embodiment, every four clocks the counters increment and the pipeline is advanced to the next instruction. In one embodiment, the 7-bit counter associated with register file Read is frozen when micro-code takes over the pipeline. In one embodiment, when micro-code has performed the computation this counter is unfrozen and advances out the end of the execution pipeline controlling the delivery of computed results. In one embodiment, micro-code has access to the t-store 640 (FIG. 6) and r-store 620 of the computation unit (e.g., FMAD 600) to assist in computing the micro-coded instruction.

In one embodiment, when an instruction is read out of the decoded instruction store contains a micro-coded instruction, the instruction is allowed to read the Register File 420 and control operand delivery to the computation unit and is then frozen. In one embodiment, the subsequent instruction is frozen prior to beginning Register File 420 access. In one embodiment, the first microinstruction comes from the micro-code entry point table. In one embodiment, transcendental instructions index this table with the T-OP field (4-bits). In one embodiment, the first micro-code instruction directs the computation unit to performs the setup stage of transcendental evaluation, and also transfers control to the micro-code table itself. In one embodiment, micro-code, then, runs a series of instructions, and on the last instruction of the series, it unfreezes the 7-bit counters allowing the delayed instruction time to access its operand registers, and allowing the micro-coded instruction to control delivery of its results to the tunnel file or Register File 420 (FIG. 4).

In one embodiment, micro-code contains a table of μInstructions and some associated pipeline control bits. In one embodiment, the entry-point of micro-code is a function of the instruction, and the μexecution counter is initialized to this point. In one embodiment, μInstructions are read out and the counter incremented every 4 cycles. In one embodiment, the final μInstruction contains the give-back control bit. In one embodiment, this is used to unfreeze the pipeline and re-establish normal instruction sequencing. In one example embodiment, the micro-code instruction table contains 29 instructions and is allocated 128 instructions.

In one embodiment, the Load Store Sequencer performs memory reference address generation and ships the generated addresses to the Load Store Unit. In one embodiment, addresses are sent to the Load Store unit 8 addresses per beat for 4 beats over a 256-bit address bus. In one embodiment, the addresses are accompanied by 8 Lane Enable bits to determine which memory references are active, and 32 Data Enable bits to determine which register bytes are participating with this memory request. The data accesses to the Register File 420 are managed by the register file sequencer. In one embodiment, should there be a buffer limitation in the Load Store Unit, the Load Store Unit will assert the Buffer Full signal, and the Processing Element will stall if it encounters another memory reference.

In one embodiment, the EMIT sequencer ships data from the data-path to a fixed function unit with an intermediate stop in the Emit Buffer. In one embodiment, data is delivered out of the Processing element 8 words per cycle over 4 cycles as the result of a computation. In one embodiment, the data is accompanied by Lane Enable bits, and Data Enable bits.

In one embodiment, the command Output Bus is used to deliver pieces of information to fixed function units when the processing element executes an instruction requiring fixed function unit performance. In one embodiment, this bus contains the OpCode and destination register specifiers, and some additional bits from the instruction. In one embodiment, Load and Store instructions have additional bits to denote signedness and data size. In one embodiment, interpolation instructions have additional bits to denote what kind of interpolation is requested, and upon which attribute. In one embodiment, the Interpolator has a means to associate WARP ID with primitive ID in order to index the Plane Equation Tables. In one embodiment, sample instructions have additional bits to denote what kind of sample is to be performed, and an index into the sampler decoder ring table.

In one embodiment, the Loop Buffer 410 (FIG. 4) contains a Find First scanner. In one embodiment, when the Execution Mask becomes empty (for any reason) there are no instructions which will execute normal instructions. In one embodiment, only instructions that can potentially enable currently idle threads need to be considered for execution. In one embodiment, the Loop Buffer 410 scans forward for Activating instruction. In one embodiment, this takes zero time plus one instruction pass after the instruction that clobbers the last EM enable bits. Should there be no Activating instructions from the current point forward, the Loop Buffer 410 will end the current WARP and start processing the next scheduled WARP. In one embodiment, the WARP scheduler will examine trace headers and migrate the WARP to the nearest trace that has an Activating Instruction and <sometime later> will schedule this WARP back into execution. In one embodiment, the scanner will advance to the first Activating instruction and that Activating instruction will execute. In one embodiment, if the WARP schedule reaches the end of the shader, then the WARP is done and will be assigned new work and start over at the top.

FIG. 17 shows an example transcendental cubic interpolation table 1700, according to an embodiment. As shown, the different transcendental instructions have varying entries per lane.

In one embodiment, micro-code is used to perform certain calculations efficiently. In one embodiment, the compiler (or assembly language writer) codes in "SIN" for example; and the micro-code performs the required calculations over 4 effective instruction periods. In one embodiment, the calculation includes argument reduction, and polynomial evaluation. In one embodiment, the Micro-code Entry Point table is used to take over the execution pipeline, perform useful work in the transition to micro-code, and transfer control to the micro-code main table. In one example embodiment, the following example code illustrates the transcendental instruction entry point table:

```
rcp o=RCP,r.s=S1.s,r.e='11111101'-S1.e,
    t<3:0>=S1.f<22:18>,r.f=S1.f<17:0>,c=c3[o,t]; GOTO HORN
rsqt o=RSQT,r.s=S1.s,{r.e,t<4>}=('11011101'-1.e),
    t<3:0>=S1.f<22:18>,r.f=S1.f<17:0>,c=c3[0,t]; GOTO HORN
sqrt o=SQRT,r.s=S1.s,r.e='11111101'-S1.e,
    t<3:0>=S1.f<22:18>,r.f=S1.f<17:0>,c=c3[o,t]; GOTO HORN
sin o=SIN,f=S1.f*2/pi:binary,r.s=f<1>,t<4>=f<0>,t<3:0>=f<-1:-3>,
    {r.e,r.f}=normalize(SPBIAS,f<-4:-27>),c=C3[o,t]; GOTO
    HORN
cos
    o=SIN,f=S1.f*2/pi:binary,r.s=f<1>^f<0>,t<4>=~f<0>,t<3:
    0>=f<-1:-3>, {r.e,r.f}=normalize(SPBIAS,f<-4:-27>),
    c=C3[o,t]; GOTO HORN
ln2
    o=LN,t=S1.f<22:17>,r.e=S1.e,r.f=normalize{S1.f<19:0>),
    c=C3[o,t];
    GOTO LN2
ln
    o=LN,t=S1.f<22:17>,r.e=S1.e,r.f=normalize{S1.f<19:0>),
    c=C3[o,t];
    GOTO LNE
log
    o=LN,t=S1.f<22:17>,r.e=S1.e,r.f=normalize{S1.f<19:0>),
    c=C3[o,t];
    GOTO LOG
```

```
pow2  o=POW,t=S1.f:binary,r.e=S1.e+t<7:0>,r.f=t<-4:-28>,
       t=t<-1:-3>,c=C3[o,t]; GOTO HORN
powe  o=POW,t=S1.f*ln2(e):binary,r.e=S1.e+t<7:0>,r.f=t<-4:-28>,
       t=t<-1:-3>,    c=C3[o,t]; GOTO HORN
pow10    o=POW,t=S1.f*ln2(10):binary,r.e=S1.e+t<7:0>,
       r.f=t<-4:-28>,t=t<-1:-3>,    c=C3[o,t]; GOTO HORN.
```

In one embodiment, In the code listed above, the structured variable 'r' is the reduced argument and will be stored in the r-store 620 (FIG. 6), while 't' is the index into the coefficient table (e.g., C012 table 650), and 'o' is the OpCode of the transcendental. In one embodiment, the C3 table 630 output is carried in 'c'. In one embodiment, most of the calculations are pure three-stage Horner FMAD instructions exiting back to normal code after 4 passes. In one embodiment, 'o' is an output of the Loop Buffer 410 (FIG. 4) over the whole micro-coded sequence. In one embodiment, in the logarithmic evaluations above, the source operand exponent is left in 'r.e' until after polynomial evaluation. In one example embodiment, the following code, then, illustrates the rest of the micro-code associated with transcendental evaluation:

```
HORN d=c2[o,t]+c*r;
     d=c1[o,t]+d*r,penultimate;
     d=c0[o,t]+d*r;
LN2  d=c2[o,t]+c*r,noExponent;
     d=c1[o,t]+d*r,noExponent;
     d=c0[o,t]+d*r,noExponent,penultimate;
     d=d+float(r.e-BIAS);
LNE  d=c2[o,t]+c*r,noExponent;
     d=c1[o,t]+d*r,noExponent;
     d=c0[o,t]+d*r,noExponent;
     d=d+float(r.e-BIAS),penultimate
     d=d*1/ln 2(e);
LOG  d=c2[o,t]+c*r,noExponent;
     d=c1[o,t]+d*r,noExponent;
     d=c0[o,t]+d*r,noExponent;
     d=d+float(r.e-BIAS),penultimate
     d=d*1/ln 2(10);
```

In one embodiment, the entry point table has 11 entries while the micro-code table has 17 entries. In one embodiment, it is easy to pack and share micro-code entries to reduce the area footprint, but with the small amount of micro-code used, there is no need. In one embodiment, the current pipeline timing for micro-code has micro-code start with the operands arriving from <wherever> the instruction specified, and the pipeline restarts at the point where the computed results are written or forward as specified by the instruction. In one example embodiment, no ancillary accesses to the Register File 420 (FIG. 4) or Tunnel files are required, and the forwarding path is used to loop one Horner evaluation to the next.

Figure 18:
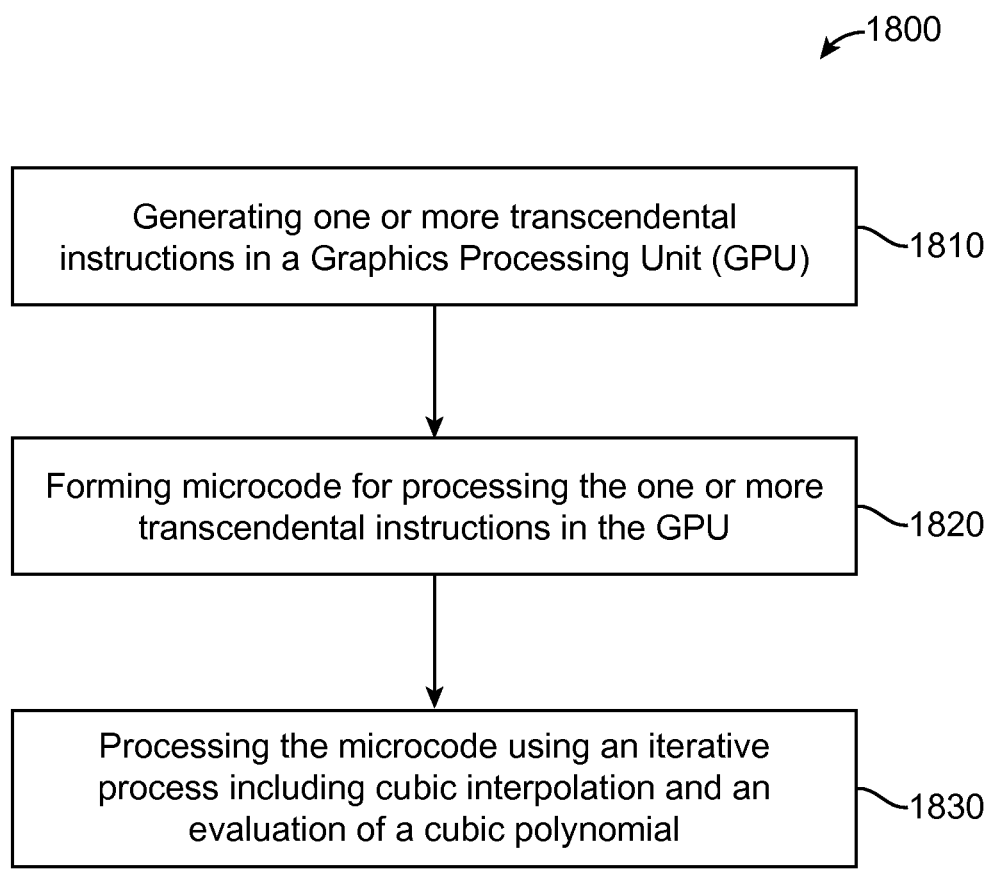
FIG. 18 shows a block diagram for a process for transcendental micro-code processing, according to one embodiment.

FIG. 18 shows a block diagram for a process 1800 for graphics processing (e.g., using a GPU of GPU module 129, FIG. 2, FMAD 600, etc.), according to one embodiment. In one embodiment, in block 1810 one or more transcendental instructions are generated in a GPU. In one embodiment, in block 1820 micro-code for processing the one or more transcendental instructions in the GPU is formed. In one embodiment, in block 1830 the micro-code is processed using an iterative process including cubic interpolation and an evaluation of a cubic polynomial.

In one embodiment, in process 1800, the iterative process comprises performing an argument reduction pass and multiple evaluation passes, wherein the multiple evaluation passes determines results of polynomials. In one embodiment, the multiple evaluation passes comprise multiple Horner evaluation passes. In one embodiment, in process 1800 the one or more transcendental instructions are processed using an FMAD (e.g., FMAD unit 600) configured for processing the one or more transcendental instructions using a first table (e.g., C012 table 650), a second table (e.g., C3 table 630), a first store (e.g., t-store 640) element, and a second store element (e.g., r-store 620).

In one embodiment, in process 1800, the first table contains coefficients for the multiple Horner evaluation passes, a first portion of the first table is accessed in a first Horner evaluation pass, and a second portion of the first table is accessed in a second Horner evaluation pass, and a third portion of the first table is accessed in a third Horner evaluation pass. In one embodiment, the second table is accessed during a last clock cycle of a first pass of an instruction, wherein a coefficient of the second table is available at a start of the first Horner evaluation pass.

In one embodiment, in process 1800 the first store element is used for holding a table indexing function, and the second store element is used for holding a reduced argument, wherein the reduced argument is used during each of the three Horner evaluation passes. In one embodiment, one or more of the one or more transcendental instructions comprise: reciprocal, reciprocal square root, square root, sin, cos, ln 2(x), ln(x), log(x), 2x, ex, and 10**x determinations.

In one embodiment, in process 1800 a particular set of coefficients from the first table and the second table are selected based on the one or more transcendental instructions and on an argument to the one or more transcendental instructions, wherein the particular set of coefficients are used during the three Horner evaluation passes.

In one embodiment, in process 1800 the GPU is used by an electronic device (e.g., electronic device 120, FIG. 2).

Figure 19:
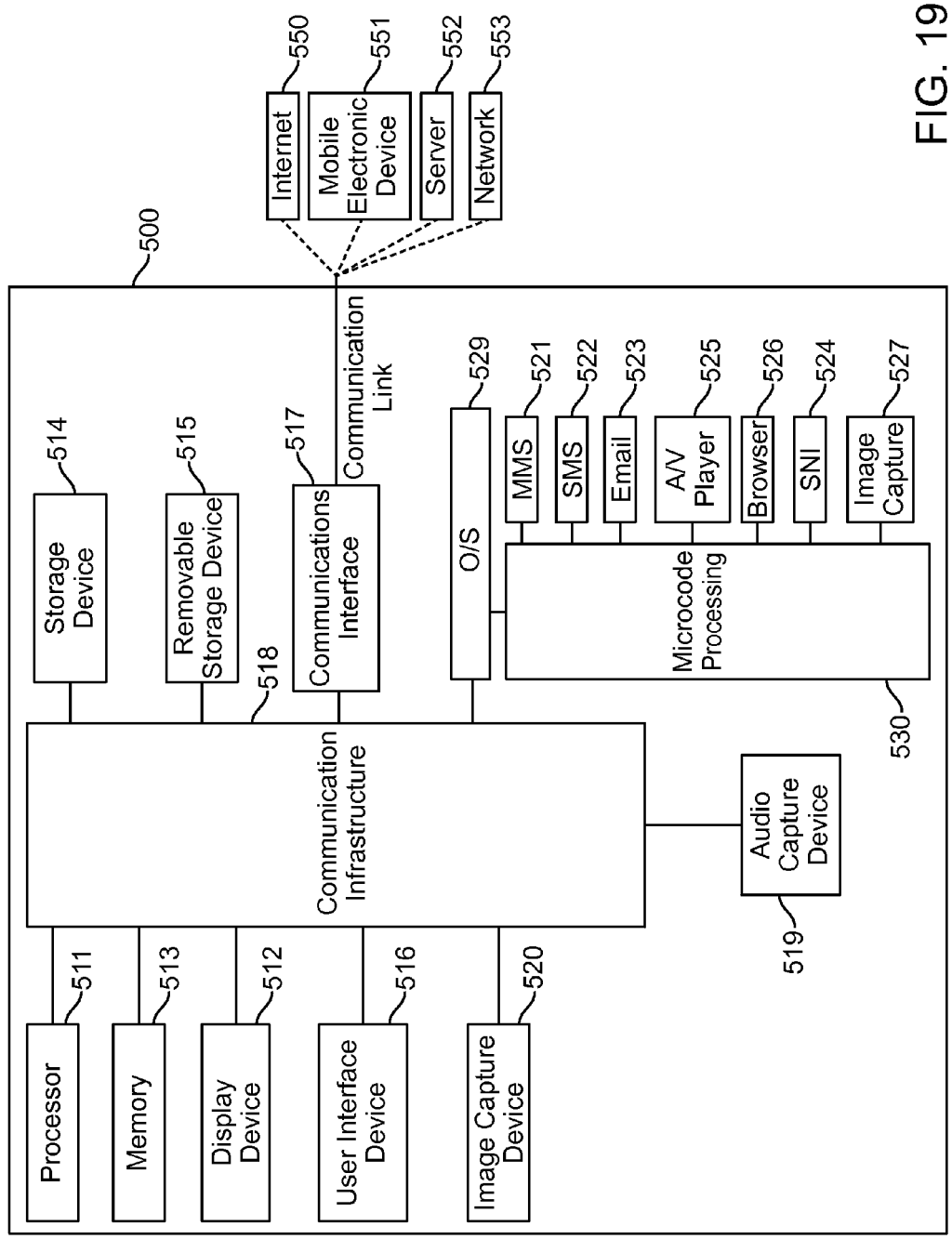
FIG. 19 is a high-level block diagram showing an information processing system comprising a computing system implementing one or more embodiments.

FIG. 19 is a high-level block diagram showing an information processing system comprising a computing system 500 implementing one or more embodiments. The system 500 includes one or more processors 511 (e.g., ASIC, CPU, etc.), and may further include an electronic display device 512 (for displaying graphics, text, and other data), a main memory 513 (e.g., random access memory (RAM), cache devices, etc.), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as Wi-Fi, Cellular), a network interface (such as an Ethernet card), a communications port, or a PCMCIA slot and card).

The communication interface 517 allows software and data to be transferred between the computer system and external devices through the Internet 550, mobile electronic device 551, a server 552, a network 553, etc. The system 500 further includes a communications infrastructure 518 (e.g., a communications bus, cross bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one implementation of one or more embodiments in a mobile wireless device (e.g., a mobile phone, tablet, wearable device, etc.), the system 500 further includes an image capture device 520, such as a camera 128 (FIG. 2), and an audio capture device 519, such as a microphone 122 (FIG. 2). The system 500 may further include application modules as MMS module 521, SMS module 522, email module 523, social network interface (SNI) module 524, audio/video (AV) player 525, web browser 526, image capture module 527, etc.

In one embodiment, the system 500 includes a micro-code processing module 530 that may implement processing similar as described regarding the processing structure 400 (FIG. 4), FMAD 600 (FIG. 6), pipeline 1400 (FIG. 14) and processing structure 1500. In one embodiment, the micro-code processing module 530 may implement the process of flowchart 1800 (FIG. 18). In one embodiment, the micro-code processing module 530 along with an operating system 529 may be implemented as executable code residing in a memory of the system 500. In another embodiment, the micro-code processing module 530 may be provided in hardware, firmware, etc.

As is known to those skilled in the art, the aforementioned example architectures described above, according to said architectures, can be implemented in many ways, such as program instructions for execution by a processor, as software modules, micro-code, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for graphics processing comprising:
   obtaining at least one transcendental instruction in a graphics processing unit (GPU);
   forming micro-code for processing the at least one transcendental instruction in a shader data path in the GPU, wherein the micro-code supplies a clock cycle number; and
   processing the micro-code based on the clock cycle number and an index to a first table using an iterative process including cubic interpolation and an evaluation of a cubic polynomial.

2. The method of claim 1, wherein the iterative process comprises performing an argument reduction pass and multiple evaluation passes, and the multiple evaluation passes determines results of polynomials.

3. The method of claim 2, wherein the multiple evaluation passes comprise multiple Horner evaluation passes.

4. The method of claim 3, wherein the at least one transcendental instruction is processed using a floating point multiplier and addition unit (FMAD) configured for processing the at least one transcendental instruction using the first table, a second table, a first store device, and a second store device.

5. The method of claim 4, wherein the first table contains coefficients for the multiple Horner evaluation passes, a first portion of the first table is accessed in a first Horner evaluation pass, a second portion of the first table is accessed in a second Horner evaluation pass, and a third portion of the first table is accessed in a third Horner evaluation pass.

6. The method of claim 5, wherein the second table is accessed during a last clock cycle of a first pass of an instruction, and a coefficient of the second table is available at a start of the first Horner evaluation pass.

7. The method of claim 6, wherein the first store device is used to hold a table indexing function, and the second store device is used to hold a reduced argument, and the reduced argument is used during each of the three Horner evaluation passes.

8. The method of claim 7, wherein the at least one transcendental instruction comprises: reciprocal, reciprocal square root, square root, sin, cos, ln 2(x), ln(x), log(x), 2x, ex, and 10**x determinations.

9. The method of claim 8, wherein a particular set of coefficients from the first table and the second table are selected based on the at least one transcendental instruction and on an argument to the at least one transcendental instruction, and the particular set of coefficients are used during the three Horner evaluation passes.

10. The method of claim 1, wherein:
the GPU is used by an electronic device;
the micro-code comprises a sequence of micro-coded instructions; and
the processing of the micro-code comprises:
switching an instruction pipeline of the GPU from a first mode to a second mode, the second mode providing control of the instruction pipeline for iterative processing of the micro-code; and
in response to processing the micro-code, switching the instruction pipeline to the first mode for pipelined processing of the instruction pipeline.

11. The method of claim 10, wherein:
the electronic device comprises a mobile electronic device; and
the processing of the micro-code further comprises:
responsive to the switching of the instruction pipeline to the second mode:
freezing a first counter of the instruction pipeline; and
incrementing a second counter of the instruction pipeline; and
responsive to the switching the instruction pipeline to the first mode:
incrementing the first counter.

12. A non-transitory computer-readable medium having instructions which when executed on a computer perform a method comprising:
obtaining at least one transcendental instruction in a graphics processing unit (GPU);
forming micro-code for processing the at least one transcendental instruction in a shader data path in the GPU, wherein the micro-code supplies a clock cycle number; and
processing the micro-code based on the cycle number and an index to a first table using an iterative process including cubic interpolation and an evaluation of a cubic polynomial.

13. The medium of claim 12, wherein the iterative process comprises performing an argument reduction pass and multiple evaluation passes, and the multiple evaluation passes determines results of polynomials.

14. The medium of claim 13, wherein the multiple evaluation passes comprise multiple Horner evaluation passes.

15. The medium of claim 14, wherein the at least one transcendental instruction is processed using a floating point multiplier and addition unit (FMAD) configured for processing the at least one transcendental instruction using the first table, a second table, a first store device, and a second store device.

16. The medium of claim 15, wherein the first table contains coefficients for the multiple Horner evaluation passes, a first portion of the first table is accessed in a first Horner evaluation pass, a second portion of the first table is accessed in a second Horner evaluation pass, and a third portion of the first table is accessed in a third Horner evaluation pass.

17. The medium of claim 16, wherein:
the second table is accessed during a last clock cycle of a first pass of an instruction;
a coefficient of the second table is available at a start of the first Horner evaluation pass;
the first store device is used to hold a table indexing function;
the second store device is used to hold a reduced argument; and
the reduced argument is used during each of the three Horner evaluation passes.

18. The medium of claim 17, wherein the at least one transcendental instruction comprises: reciprocal, reciprocal square root, square root, sin, cos, ln 2(x), ln(x), log(x), 2x, ex, and 10**x determinations, a particular set of coefficients from the first table and the second table are selected based on the at least one transcendental instruction and on an argument to the at least one transcendental instruction, and the particular set of coefficients are used during the three Horner evaluation passes.

19. The medium of claim 12, wherein:
the GPU uses a single-instruction multiple-thread (SIMT) processing architecture;
the GPU is employed by an electronic device;
the micro-code comprises a sequence of micro-coded instructions; and
the processing of the micro-code comprises:
switching an instruction pipeline of the GPU from a first mode to a second mode, the second mode providing control of the instruction pipeline for iterative processing of the micro-code; and
in response to processing the micro-code, switching the instruction pipeline to the first mode for pipelined processing of the instruction pipeline.

20. A graphics processing unit (GPU) for an electronic device comprising:
at least one processing element coupled to a memory device, wherein the at least one processing element is configured to:
obtain at least one transcendental instruction in the GPU, form micro-code to process the at least one transcendental instruction in a shader data path in the GPU, wherein the micro-code supplies a clock cycle number, and process the micro-code based on the clock cycle number and an index to a first table using an iterative process including cubic interpolation and an evaluation of a cubic polynomial.

21. The GPU of claim 20, wherein the iterative process is configured to perform an argument reduction pass and multiple evaluation passes, and the multiple evaluation passes are configured to determine results of polynomials.

22. The GPU of claim 21, wherein the multiple evaluation passes comprise multiple Horner evaluation passes.

23. The GPU of claim 22, wherein the at least one transcendental instruction is processed using a floating point multiplier and addition unit (FMAD) configured to process the at least one transcendental instructions using the first table, a second table, a first store device, and a second store device.

24. The GPU of claim 23, wherein the first table contains coefficients for the multiple Horner evaluation passes, a first portion of the first table is accessed in a first Horner evaluation pass, a second portion of the first table is accessed in a second Horner evaluation pass, and a third portion of the first table is accessed in a third Horner evaluation pass.

25. The GPU of claim 24, wherein:
the second table is accessed during a last clock cycle of a first pass of an instruction;
a coefficient of the second table is available at a start of the first Horner evaluation pass;
the first store device is configured to hold a table indexing function;
the second store device is configured to hold a reduced argument; and
the reduced argument is used during each of the three Horner evaluation passes.

26. The GPU of claim 25, wherein the at least one transcendental instruction comprises: reciprocal, reciprocal square root, square root, sin, cos, ln 2(x), ln(x), log(x), 2x, ex, and 10**x determinations.

27. The GPU of claim 26, wherein a particular set of coefficients from the first table and the second table are selected based on the at least one transcendental instruction and on an argument to the at least one transcendental instruction, and the particular set of coefficients are used during the three Horner evaluation passes.

28. The GPU of claim 21, wherein the GPU uses a single-instruction multiple-thread (SIMT) processing architecture.

29. The GPU of claim 28, wherein:
the electronic device comprises a mobile electronic device;
the micro-code comprises a sequence of micro-coded instructions; and
the at least one processing element is configured to process the micro-code to:
switch an instruction pipeline of the GPU from a first mode to a second mode, the second mode providing control of the instruction pipeline for iterative processing of the micro-code; and
in response to processing the micro-code, switch the instruction pipeline to the first mode for pipelined processing of the instruction pipeline.

* * * * *